(12) United States Patent
Gorilovsky

(10) Patent No.: US 9,571,632 B2
(45) Date of Patent: Feb. 14, 2017

(54) MOBILE DEVICE

(75) Inventor: Dmitry Alekseevich Gorilovsky, St. Petersburg (RU)

(73) Assignee: Yota Devices IPR Ltd., Road Town, Tortola (VG)

( * ) Notice: Subject to any disclaimer, the term of this patent is extended or adjusted under 35 U.S.C. 154(b) by 394 days.

(21) Appl. No.: 13/880,460

(22) PCT Filed: Oct. 20, 2011

(86) PCT No.: PCT/RU2011/000816
§ 371 (c)(1),
(2), (4) Date: Dec. 2, 2013

(87) PCT Pub. No.: WO2012/053939
PCT Pub. Date: Apr. 26, 2012

(65) Prior Publication Data
US 2014/0080546 A1    Mar. 20, 2014

(30) Foreign Application Priority Data

| Oct. 20, 2010 | (GB) | ................................ | 1017776.4 |
| Dec. 10, 2010 | (GB) | ................................ | 1020999.7 |
| Jan. 21, 2011 | (GB) | ................................ | 1101078.2 |
| Jul. 20, 2011 | (GB) | ................................ | 1112458.3 |
| Aug. 18, 2011 | (GB) | ................................ | 1114247.8 |

(51) Int. Cl.
| H04M 1/03 | (2006.01) |
| H04M 1/725 | (2006.01) |
| G06F 1/16 | (2006.01) |
| G06F 1/26 | (2006.01) |
| H04W 84/12 | (2009.01) |
| H04M 1/02 | (2006.01) |

(52) U.S. Cl.
CPC ........ H04M 1/72583 (2013.01); G06F 1/1626 (2013.01); G06F 1/1694 (2013.01); G06F 1/26 (2013.01); H04M 1/0202 (2013.01); H04M 1/035 (2013.01); H04W 84/12 (2013.01); *H04M 2250/22* (2013.01)

(58) Field of Classification Search
CPC ..................................................... H04M 1/035
See application file for complete search history.

(56) References Cited

U.S. PATENT DOCUMENTS

| 8,023,261 B2 * | 9/2011 | Sanford | ............... H05K 5/0013 361/679.55 |
| 2005/0129267 A1 * | 6/2005 | Azima | ................... H04R 7/045 381/431 |

(Continued)

FOREIGN PATENT DOCUMENTS

| EP | 1 827 057 A2 | 8/2007 |
| WO | 00/02417 A1 | 1/2000 |
| WO | 03/015382 A1 | 2/2003 |

OTHER PUBLICATIONS

International Search Report, dated Aug. 16, 2012, issued in priority International Application No. PCT/RU2011/000816.

*Primary Examiner* — David Bilodeau

(57) ABSTRACT

Mobile device including a screen operable to provide sound output from the screen. The device may include distributed mode loudspeaker (DML) technology arranged to vibrate the entire screen. The device may be arranged wherein the whole screen surface acts as a speaker. A speaker hole in the device can be fully eliminated.

12 Claims, 45 Drawing Sheets

(56) References Cited

U.S. PATENT DOCUMENTS

| | | | | |
|---|---|---|---|---|
| 2007/0202917 A1* | 8/2007 | Phelps | ............... | H04R 7/045 |
| | | | | 455/556.1 |
| 2008/0298608 A1* | 12/2008 | Wilcox | ............... | H03F 3/20 |
| | | | | 381/120 |
| 2012/0149437 A1* | 6/2012 | Zurek | ............... | H04M 1/0266 |
| | | | | 455/566 |
| 2013/0312594 A1* | 11/2013 | Bertolini | ............... | B60J 11/00 |
| | | | | 89/36.02 |
| 2014/0155120 A1* | 6/2014 | Karmanenko | ........ | G06F 1/1626 |
| | | | | 455/557 |

* cited by examiner

Customer Proposition

1. Value Proposition
   - 1st own Yota-branded 4G smartphone aimed to deliver unique technology, services and user experience 2. Unique Sales points
   - Individual Style, easy personalization
   - 1+ Communications
   - Always On notifications and themes on back cover
   - Mobile Broadband
   - Cutting edge technology
   - Surface Sound
   - Brand UI

FIGURE 1

Smartphone Specification

| Category | Requirements |
|---|---|
| ID, Dimensions | Touch curved monoblock, EPD on back side<br>Size: 120 x 62 x 12.5<br>Weight: TBD |
| AP | Qualcomm MSM 8260<br>Dual Core Scorpion – 1.2GHz/1.2GHz (Apps)<br>High-end Multimedia and Connectivity chipset |
| Connectivity | MDM 9200<br>LTE FDD (Bands 7, 13, 14, 1, 4, 20)<br>LTE TDD (Bands 38, 40)<br>GSM / EDGE 850 / 900 / 1800 / 1900<br>3G / HSPA 900 / 1800 / 2100<br>MSM 8260 (On-board)<br>Wi-Fi b/g/n, Bluetooth 4.0, gpsOne Gen 8 with GNSS |
| OS | Google Android 3.x (h, i, j) |
| Calls | 2G/3G, VoIP, Video Calls<br>Exact Implementation TB |
| Audio | On-board Audio: 128-Voice Polyphony,<br>QconcertPlus, Dolby 5.1 Surround,<br>Echo and Noise Cancellation.<br>Additional ANC (Audience).<br>2 Microphones.<br>NXT display surface sound (No speakers) |
| Camera | Camera: 5MP AF, 4x Digital zoom, LED flash. Front – 1MP.<br>Exact Camera spec: TBD |
| Sensors | Proximity, Light, Accelerometer, Compass<br>Squeeze |
| Display | Front: 4" WVGA (800 x 480 Or 854 x 480)<br>Technology: AMOLED or sIPS / FFS<br>Nissha Capacitive touch screen with Integrated NXT sound and Haptics<br>Glass: Gorilla Glass (Corning) |
| Back Screen | Electronic Paper Display under glass on back side (E-INK). |
| Battery | 1500 – 2000 mAh (TBD)<br>High Capacity and High Density |
| Memory | NAND 1 GB; RAM 512 MB; Flash 32 GB |
| Case and materials | Case: Single block<br>Materials: Plastic or Texin™<br>Exact materials spec: TBD |
| Accessories | Inbox + Optional<br>Accessories concept TBD |

FIGURE 2

Industrial Design
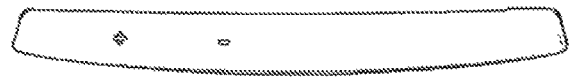
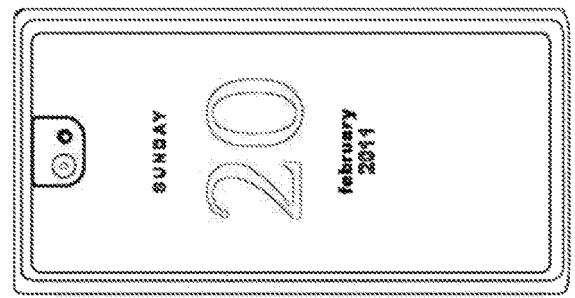
Back view when device on
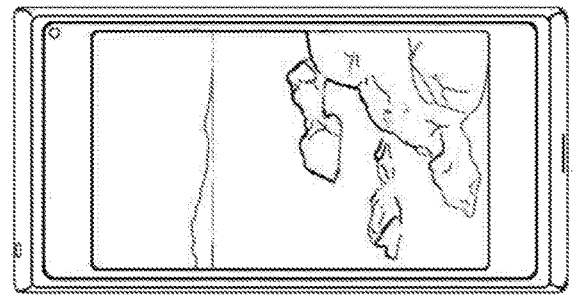
Front view when device on
FIGURE 3

Platform: Qualcomm MSM 8260 + MDM 9200

| FEATURES | MSM8260 |
|---|---|
| Process Technology | 45nm |
| Package | 976 NSP 14x14x1.4mm (0.4mm pitch) |
| Processor | Dual Core Scorpion – 1.2GHz/1.2GHz (Apps) QDSP6V3 – 400MHz (Apps) ARM11 + L2 – 490MHz (Modem) QDSP4 – 147MHz (Modem) |
| MODEM | HSPA+ GSM/GPRS/EDGE |
| Peak Data Rates UL/DL | HSPA+: DL 14Mbps / UL 5.76Mbps |
| Modem Enhancements | UMTS: Equalizer, Rx Diversity GSM: SAIC |
| Frequency Support | UMTS: 800/850/900/1700/1900/2100/AWS GSM: OB EGPRS (850, 900, 1800, 1900) |
| RF+PMIC Chipset | QTR8615 (RxD) + PM8058 + PM8901 QTR9215 (no RxD)+ PM8058 + PM8901 |
| Memory | 333MHz ISW266MHz LPDDR2 |
| LCD Support | 24-bit, WXGA (1280x800) |
| Bluetooth | WCN 2243 BT 4.0, low energy, FM Rx/Tx |
| WLAN | 802.11b/g/n WCN1314 |
| USB | USB2.0 High Speed OTG (480Mbps) |

| FEATURES | MSM8260 |
|---|---|
| Qtv (Video Decode) | Playback: 30fps 1080p (MPEG-4 / MPEG-2 / H.264 / DivX / VC-1 / WMV-9) 30fps @ FWVGA (H.263) 30fps D1 (Sorenson Spark, On2 VP6) Streaming: 30fps 1080p (MPEG-4 / MPEG-2 / H.264 / DivX / VC-1 / WMV-9) 30fps D1 (H.263 / VP6 / Spark) |
| Qcamcorder (Offline Video Encoding) | 30fps @1080p (MP4/H.264) 30fps @ FWVGA (H.263) |
| Qcamera | 16M Pixel |
| Audio | 128-Voice Polyphony QconcertPlus, Dolby 5.1 Surround, Low Power Audio Core Enhanced Echo Cancellation FLUENCE (Noise cancellation) |
| Graphics | Adreno 220 Max LCD: WXGA - Triangles/s: 88M peak - 3D Pixels/s: 532M peak - Instructions/s: 2,660M - Dedicated OVG Core APIs: OpenGL ES 1.1, OpenGL ES 2.0, Direct Draw, OpenVG1.1, SVG Tiny 1.2, BREW 2D |
| GPS | gpsOne Gen 8 with GNSS Standalone Assisted, gpsOneXTRA, 2db improvement vs Gen 7 |
| Security and DRM | SecureMSM v4 with TrustZone Microsoft WMDRM 10 / HDCP OEM Programmable OTP Storage |

| FEATURES | MDM9200 |
|---|---|
| Process Technology | 45nm |
| Package | 504 CSP, 13x13x1.4mm (0.5mm pitch) |
| Processor | ARM926-256MHz QDSP6-600MHz |
| MODEM | Release 8 LTE Release 8 DC-HSPA+ GSM/EGPRS |
| Peak Data Rates UL/DL | DC-HSPA+: DL 42Mbps / UL 5.76Mbps LTE FDD: DL 100Mbps / UL 50 Mbps (Cat 3) LTE TDD: DL 68Mbps / UL 17 Mbps (Cat 3) |
| Modem Enhancements | UMTS: RxD, EQ, SCHIC, Q-ICE, 2x2 DL MIMO LTE: 2x2 DL SU-MIMO with SIC GSM: SAIC |
| Frequency Support | UMTS: 3GPP: 700 MHz, 800 MHz, 850 MHz, 900 MHz, 1700 MHz, 1800 MHz, 1900 MHz, 2100 MHz, 2300MHz, 2600 MHz GSM: OB EGPRS (850, 900, 1800, 1900) |
| RF+PMIC Chipset | RTR8600 + PM8028 |
| USB | USB 2.0 All Speed Peripheral or Host |
| GPS | gpsOne Gen 8 with GNSS Standalone Assisted, gpsOneXTRA, 2db improvement vs Gen 7 |

FIGURE 6

Back Screen

1. Image
- Resolution: 700~900 x 480 (target: similar to front display)
- Colors: 16 Grey scale (E-ink) or 65K (LG) (TBD)
- Contrast: 10:1 ~ 20:1 (TBD), Reflective ratio: 40%+
- Refresh ratio: 150 ms ~ 400 ms (TBD)
- Ability to refresh any area starting from 1 pixel
- Color scheme must conform to case color

2. Power Consumption
- Approx. 1000 full screen updates: 300 mAh
- To minimize power consumption update rate should be minimized to ~ twice per minute
- Does not consume / require power when in bi-stable state

3. Manufacturing
- Curved shape, Laminated to glass

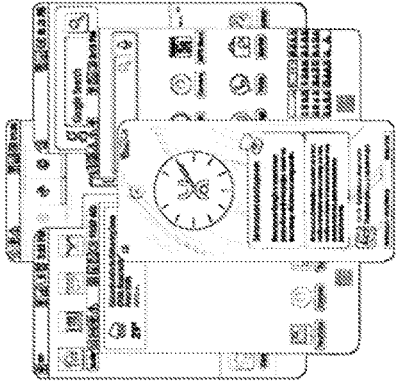
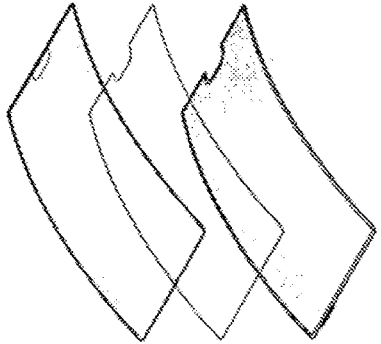

FIGURE 7

Yota Home

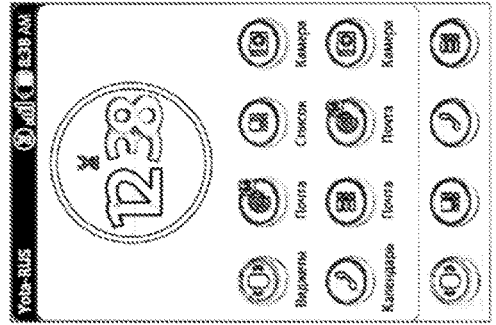

1. Yota User Interface (UI)
   ✓ Customized UI: Home and Lock Screen, Menu, Contacts, Caller, Apps Launching / Switching, etc.
   ✓ UI Guidelines creation 2. Back Screen
   ✓ Interactions, Control, Use cases, Personalization, Widgets, Privacy 3. Preinstalled Widgets
   ✓ E.g. Clock, Social aggregator, Communications Log, "Favorites" Bucket, News, Weather, Yota Connection, Battery, Contacts Favorites, Latitude, Player...
   ✓ Provide the Key 10 Widgets

FIGURE 9

Ideas for Applications

1. 1+ Communications
   - Communications with 1 closest person
   - Instant delivery, no confirmation
   - Share screen (Movies, games, "see what I see")
   - Back screen Drawing and Tapping 2. Back Screen
   - Context related Themes (Weather, Location, Environment)
   - Widgets, Notifications
   - Personalization
   - Post cards
   - Operator Push (Congratulations, Customer info, ...)

3. Mobile Broadband
   - Applications leveraging super fast Mobile Broadband
   - Content, Video Calls, Video Sharing

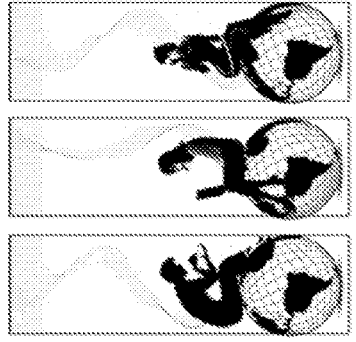

FIGURE 11

Ideas for Applications

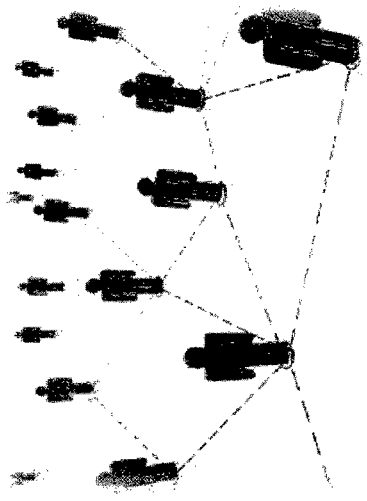

4. Share Network
   - ✓ Personal WiFi Hotspot anywhere
   - ✓ Share network
   - ✓ PC tethering 5. Voice / Video Calls
   - ✓ Free VoIP / Video Calls (as part of Data), e.g. Skype
   - ✓ Integration with Caller applications 6. Back End Integration
   - ✓ Features leveraging close operator and device integration
   - ✓ Remote Device management
   - ✓ Over the Air device provisioning and services 7. Other
   - ✓ First Switch On
   - ✓ Transparent Update of features

FIGURE 12

| DIP switch / Pole | Value | Description | Notes |
|---|---|---|---|
| S100 / 1 (same for S102) | 0 | Lower amplifier gain selected, IN1 = 0dB and IN2 = 24dB | Input 1 or 2 is selected with S100 / Pole 2 |
| | 1 | Higher gain selected, IN1 = 6dB and IN2 = 30dB | Input 1 or 2 is selected with S100 / Pole 2 |
| S100 / 2 (same for S102) | 0 | Input IN1 selected | |
| | 1 | Input IN2 selected | |
| S100 / 3 (same for S102) | 0 | HW control selected | |
| | 1 | SW control selected | SW control requires I2C control from host |
| S100 / 4 (same for S102) | 0 | Shutdown state | Power saving mode |
| | 1 | Operational state | Normal mode |
| S101 / 1 and 2 (same for S103) | 0 and 0 | Audio input test points are connected to IN1 | Default value. Audio input test points are connected to both inputs (lower input impedance is ok) |
| | 1 and 1 | Audio input test points are NOT connected to IN1 | Not used |
| S101 / 3 and 4 (same for S103) | 0 and 0 | Audio input test points are connected to IN2 | Default value. Audio input test points are connected to both inputs (lower input impedance is ok) |
| | 1 and 1 | Audio input test points are NOT connected to IN2 | Not used |

FIGURE 22

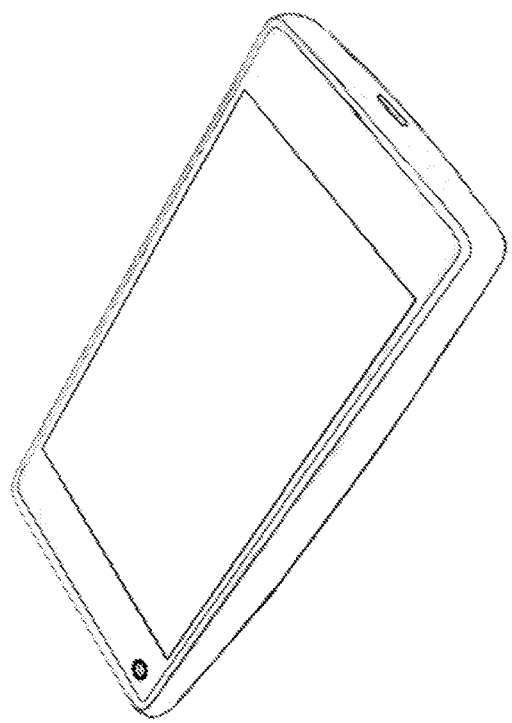
FIGURE 26

| PTION | PTION | PTION | DESCRIPTION LEVEL 4 | MANUFACTURER NAME | Material | Manufacturing technology |
|---|---|---|---|---|---|---|
| Main Assembly | | | | | | |
| | Front Window Assembly | | | Nissha | | |
| | | Front Window | | Nissha | Gorilla Glass | Flat Gorilla Glass |
| | | Actuator Block | | Nissha | | |
| | | Front Window Adhesive | | Nissha | PET | |
| | Main Cover Assembly | | | Yushing Spring | | |
| | | Main Cover | | Yushing Spring | ABS/PC + TPU | 2K injection moulding |
| | | Window Fixing Plate | | Yushing Spring | Stainless Steel + Ti | Drawing + inmould |
| | Display Module | | | Hydis | | |
| | Center Frame Asembly | | | | | |
| | | Center Frame | | Camtronic | Aluminum | Machined |
| | | Adhesive Display | | Stokvis | PET | |
| | Engine PWB Assembly | | | | | |
| | | PWB Engine | | | | |
| | | | Vibramotor | | | |
| | Main Antenna Frame Assembly | | | | | |
| | | Main Antenna Frame Thin | | Yushing Spring | Machinable PU | Machining |
| | | Flex PWB Assembly | | | | |
| | | | Micro USB Connector | | | |
| | | | Microphone | | | |
| | | | Flash LED | | | |
| | | | Main camera Dummy | | | |
| | MIMO Antenna Frame Assembly | | | | | |
| | | MIMO Antenna Frame Thin | | Yushing Spring | Machinable PU | Machining |
| | | Front Camera Dummy | | | | |
| | Battery Assembly | | | | | |
| | | Battery Support | | Yushing Spring | Machinable PU | Machining |
| | | Battery Dummy | | Nokia | | |
| | Back Window Assembly | | | | | |
| | | Back Window Frame | | Yushing Spring | ABS/PC | Injection moulding |
| | | Back Window Frame Adhesive | | Yushing Spring | PET | |
| | | EPD | | | PET | |
| | | Back Window Glass | | Lens One | Gorilla Glass | |
| | | Back Window Plastic | | Yushing Spring | PMMA | |
| | | | | | | |
| | SCREWS | | | | | |
| | | M 1.4 X 3 | | SFS Intec | Stainless Steel | |
| | | M 1.6 X 4 | | SFS Intec | Stainless Steel | |
| | | M 1.4 X 1.8 (?) | | SFS Intec | Stainless Steel | |

FIGURE 29

Standard Exciters

| Part No. | Max Power Rating | Nominal Impedance | Maximum Outside Diameter (mm) | Thickness (mm) | Weight (g) |
|---|---|---|---|---|---|
| HIAX32C30-4/8 | 30W rms | 4 ohm | 59.5 | 18.5 | 133.0 |
| HIAX20C03-8 | 3W rms | 8, 16 ohm | 47.0 | 11.5 | 25.0 |
| HIAX13C02-4 | 2W rms | 4, 8, 16, 32 ohm options | 38.0 | 11.0 | 13.2 |
| HIAX11C005-32 | 0.5W rms | 32 ohm | 26.3 | 8.5 | 7.8 |

High Shove Exciters

| Part No. | Max Power Rating | Nominal Impedance | Maximum Outside Diameter (mm) | Thickness (mm) | Weight (g) |
|---|---|---|---|---|---|
| HIAX25C20-8/HS | 20W rms | 8 ohm | 54.6 | 33.5 | 260.0 |
| HIAX25C15-8/HS | 15W rms | 4, 8 ohm options | 45.0 | 17.0 | 56.0 |
| HIAX19C05-4/HS | 5W rms | 4, 6, 8 ohm options | 73.0 | 20.0 | 83.0 |
| HIAX19C01-4 | 3W rms | 4, 8 ohm options | 47.0 | 12.8 | 29.0 |

FIGURE 44

Low Profile Exciters

| Part No. | Max Power Rating | Nominal Impedance | Maximum Outside Diameter (mm) | Thickness (mm) | Weight (g) |
|---|---|---|---|---|---|
| HIAX19C01-4/LP | 1W rms | 4, 8 ohm options | 40.0 | 5.3 | 11.3 |
| HIAX13C02-4/LP | 2W rms | 4, 8, 16, 32 ohm options | 38.0 | 9.0 | 10.0 |
| HIAX11C005-32/LP | 0.5W rms | 32 ohm | 23.8 | 5.7 | 5.5 |

Special Use Exciters

| Part No. | Max Power Rating | Nominal Impedance | Notes | Maximum Outside Diameter (mm) | Thickness (mm) | Weight (g) |
|---|---|---|---|---|---|---|
| HIAX25C07-4/X | 7W rms | 4, 6, 8, 12, 16, 24 ohm options | Waterproof and ruggedised | 70.0 | 18.1 | 89.0 |
| HIAX25C07-4/SP | 7W rms | 4, 6, 8 ohm options | Robust 4-point mounting | 93.1 | 20.4 | 64.0 |
| HIAX19C05-4/SP | 5W rms | 4, 8 ohm options | Robust 4-point mounting | 67.4 | 16.5 | 30.7 |

FIGURE 45

MOBILE DEVICE

CROSS REFERENCE TO RELATED APPLICATIONS

This application claims the priority of PCT/RU2011/000816, filed on Oct. 20, 2011, which claims priority to Great Britain Application No. 1017776.4, filed Oct. 20, 2010; Great Britain Application No. 1020999.7, filed Dec. 10, 2010; Great Britain Application No. 1101078.2, filed Jan. 21, 2011, Great Britain Application No. 1112458.3, filed Jul. 20, 2011, and Great Britain Application No. 1114247.8, filed Aug. 18, 2011, the entire contents of all of which are hereby incorporated in total by reference.

BACKGROUND OF THE INVENTION

1. Field of the Invention

The field of the invention relates to mobile devices operable to provide sound output.

2. Technical Background

On a mobile device, for good quality audio performance a large speaker is typically provided, with a large and ugly speaker hole. It would be desirable to provide good quality audio performance without such a hole. But if the hole is filled in, the sound will have difficulty coming out. Also for example, such a hole can become clogged with dirt, or it can allow water into the device which can damage electronics in the device.

3. Discussion of Related Art

In WO2008081657A1 there is described a mobile communication device which communicates with a base station by wireless communication. The device comprises a back side chassis and a front side chassis linked to each other at a longitudinal edge and capable of opening and closing in a direction crossing the longitudinal direction, a touch panel operable when the back side chassis and the front side chassis are closed, a speaker hole and a microphone hole arranged in the longitudinal direction on an outside surface appeared when the back side chassis and the front side chassis are closed, and an inside display which is disposed on one of the inside surfaces appeared when the back side chassis and the front side chassis are opened and displays an image.

SUMMARY OF THE INVENTION

According to a first aspect of the invention, there is provided a mobile device including a screen operable to provide sound output from the screen.

The mobile device may include distributed mode loudspeaker (DML) technology arranged to vibrate the entire screen.

The mobile device may be one wherein the whole screen surface acts as a speaker.

The mobile device may be one wherein a speaker hole in the device can be fully eliminated.

The mobile device may include a front screen, wherein audio actuators are arranged on a front screen material.

The mobile device may be one wherein the device is operable to drive only one actuator, in order to provide a localized sound output from the front screen material.

The mobile device may be one wherein two small drivers/exciters are arranged under the screen to make the screen vibrate.

The mobile device may include a main cover assembly with a main window suspension.

The mobile device may be one including an engine board which includes a battery charging solution and audio amplifiers.

The mobile device may be one wherein audio actuators are connected using board-to-wire connectors.

The mobile device may be one wherein audio components in the engine board comprise two audio amplifiers.

The mobile device may be one wherein audio amplifiers are a high efficiency Class H driver for ceramic speakers and piezo haptic actuators.

The mobile device may be one wherein external voltage boosting components provide a required driving voltage for audio actuators from a battery voltage source.

The mobile device may be one wherein the device comprises Thermoplastic elastomer (IPE) material.

The mobile device may be one wherein the TPE material is part of the device casing material.

The mobile device may be one wherein a device front window, working as an audio panel, is suspended by a gasket comprising a soft gasket material.

The mobile device may be one wherein the soft gasket thickness is in the range of 0.2 mm to 2 mm.

The mobile device may be one wherein the soft gasket allows the window to float and it also seals the back cavity.

The mobile device may be one wherein a cover lip under the window extends below edges of the window.

The mobile device may be one wherein front window suspension is arranged using soft TPE material.

The mobile device may be one wherein the soft TPE material is situated at the top of device side walls.

The mobile device may be one wherein the soft TPE material is in the thickness range of 0.2 mm to 2 mm The mobile device may be one wherein soft TPE material is situated under the window and the window is fixed to it by glue or adhesive.

The mobile device may be one wherein a back cavity air gasket comprises soft TPE.

The mobile device may be one wherein there is a small groove around the window.

The mobile device may be one wherein a front window module is in direct attachment to a TPE outside skin, for more elastic suspension area.

The mobile device may be one wherein the screen comprises a front window, and the front window is operable to be suspended using a window frame.

The mobile device may be one wherein the window is fixed to the frame by adhesive tape.

The mobile device may be one wherein several window suspension elements are arranged between the frame and side walls of the device.

The mobile device may be one wherein suspension elements are moulded from TPE material.

The mobile device may be one wherein the TPE material is in the shore stiffness range from 60 A to 95 A.

The mobile device may be one wherein the device includes left and right side walls including soft back cavity shielding lips operable to isolate the back cavity from a freely suspended front side of the device.

The mobile device may be one wherein the device includes fixed points for front window suspension.

The mobile device may be one wherein the device includes a soft TPE cover under a window.

The mobile device may be one wherein the device includes an internal metal support construction.

The mobile device may be one wherein the device includes two or three rigid fixing points per side between an internal aluminum center frame and an outside base frame.

The mobile device may be one wherein an air volume behind the screen is sealed.

The mobile device may be one wherein the screen is glued to a device frame with silicone.

The mobile device may be one wherein the screen is glass.

The mobile device may be one wherein the screen is 0.5 mm thickness gorilla glass.

The mobile device may be one wherein the device includes a glass back window assembly.

The mobile device may be one wherein the device includes front and back display windows made of Corning Gorilla glass.

The mobile device may be one wherein cylindrically curved glass is used for the device back side window.

The mobile device may be one wherein the device audio system includes one or more of: On-board Audio: 128-Voice Polyphony, QconcertPlus, Dolby 5.1 Surround, Echo and Noise Cancellation. Additional ANC (Audience), 1 or 2 Microphones, Deep stereo Surface Sound, No conventional speakers, and Adaptive Noise Cancellation.

The mobile device may be one wherein a device case is a single block.

The mobile device may be one wherein a device case comprises Plastic or Texin™.

The mobile device may be one wherein the device includes an aluminum center part for distributing heat evenly.

The mobile device may be one including digital signal processing (DSP) in an audio signal path.

The mobile device may be one wherein drivers in attachment with the screen are operable to provide haptic feedback.

The mobile device may be one wherein the drivers are operable to produce a localized haptic feedback from a part of the screen.

The mobile device may be one wherein the drivers comprise electro active polymers.

The mobile device may be one wherein the device is provided with a driver module and a touch screen, the driver module operable to control the drivers to disperse bending waves evenly across the surface of the touch screen so that a user experiences the effect of depressing mechanical keys when touching keys displayed on the touch screen.

The mobile device may be one wherein the mobile device is portable.

The mobile device may be one wherein the mobile device is a mobile phone, a portable digital assistant, a laptop, a digital audio player or a tablet computer.

The mobile device may be one wherein the mobile device includes one or more of: a virtual keyboard, a touch screen, two screens each of which is a touch screen, a bi-stable screen, a bi-stable touch screen, a screen that is not a bi-stable screen which is a touch screen, a first and a second bi-stable screen, a second bi-stable screen which is a touch screen, a second bi-stable screen which is not a touch screen.

The mobile device may be one wherein the mobile device is a dual screen bar form factor phone with a back screen bi-stable display.

The mobile device may be one wherein the mobile device includes a back screen, wherein the back screen is operable to display a notification on the back screen, from any application or service running on the device.

The mobile device may be one wherein a screen occupies greater than 90% of the area of a major face of the device on which it is located.

The mobile device may be one wherein the mobile device is a bar form factor display device including a concave front face and a convex rear face.

The mobile device may be one wherein the mobile device presents a seamless, unibody surface.

There is provided use of the mobile phone of any of the above statements, wherein the device is placed face down on a commensurately shaped surface of an object and the screen face is then driven so that sound is emitted not just by the screen, but also by the object whose surface is in contact with the screen.

According to a second aspect of the invention, there is provided a method of providing sound output from a screen of a mobile device of any of the above statements, the device including the screen, comprising the step of: providing sound output from the screen.

According to a third aspect of the invention, there is provided a computer program product operable to provide sound output from a screen of a mobile device of any of the above statements, the device including the screen, wherein the computer program product is operable to provide sound output from the screen.

BRIEF DESCRIPTION OF THE DRAWINGS

FIG. 1 shows an example of a customer proposition.

FIG. 2 shows an example of a smartphone specification.

FIG. 3 shows an example of a mobile device industrial design.

FIG. 6 shows examples of chipsets for mobile devices.

FIG. 7 shows an example specification for a back screen of a mobile device.

FIG. 9 shows examples of aspects of an example mobile device.

FIG. 11 shows examples of applications for a mobile device.

FIG. 12 shows further examples of applications for a mobile device.

FIG. 22 shows a table of Engine board DIP switches.

FIG. 26 shows a prototype device, front and back.

FIG. 29 shows materials and suppliers for the mechanics trial prototype.

FIG. 44 shows families of audio exciters available from HiWave Technologies PLC.

FIG. 45 shows families of audio exciters available from HiWave Technologies PLC.

DETAILED DESCRIPTION

Figure 4:
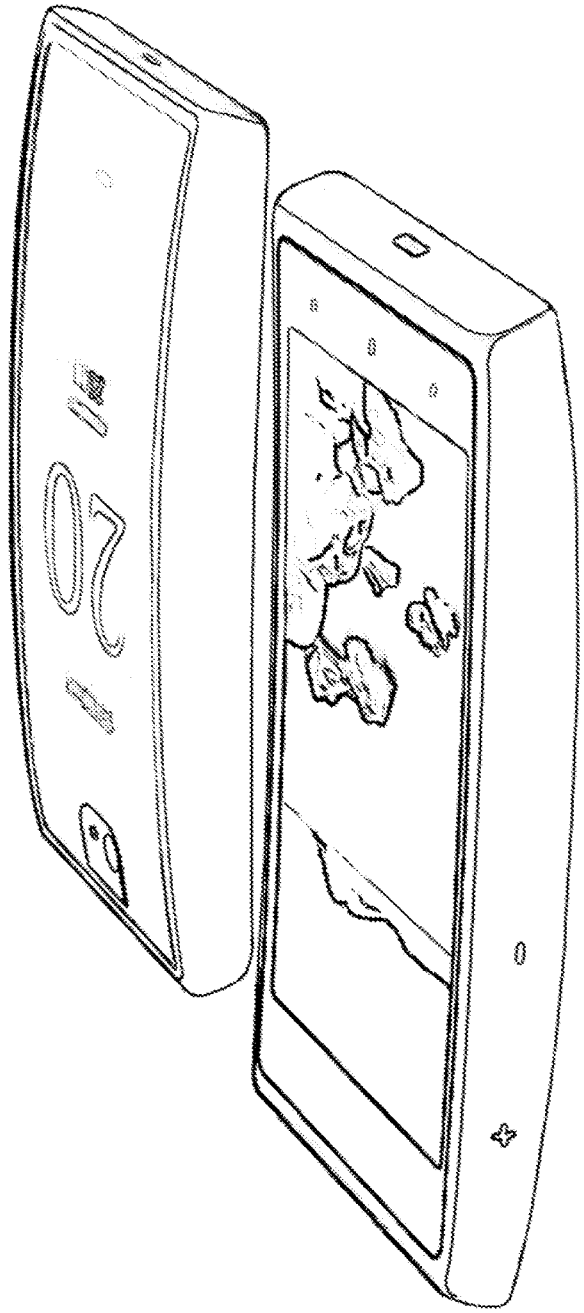
FIG. 4 shows an example of a mobile device industrial design.
Figure 5:
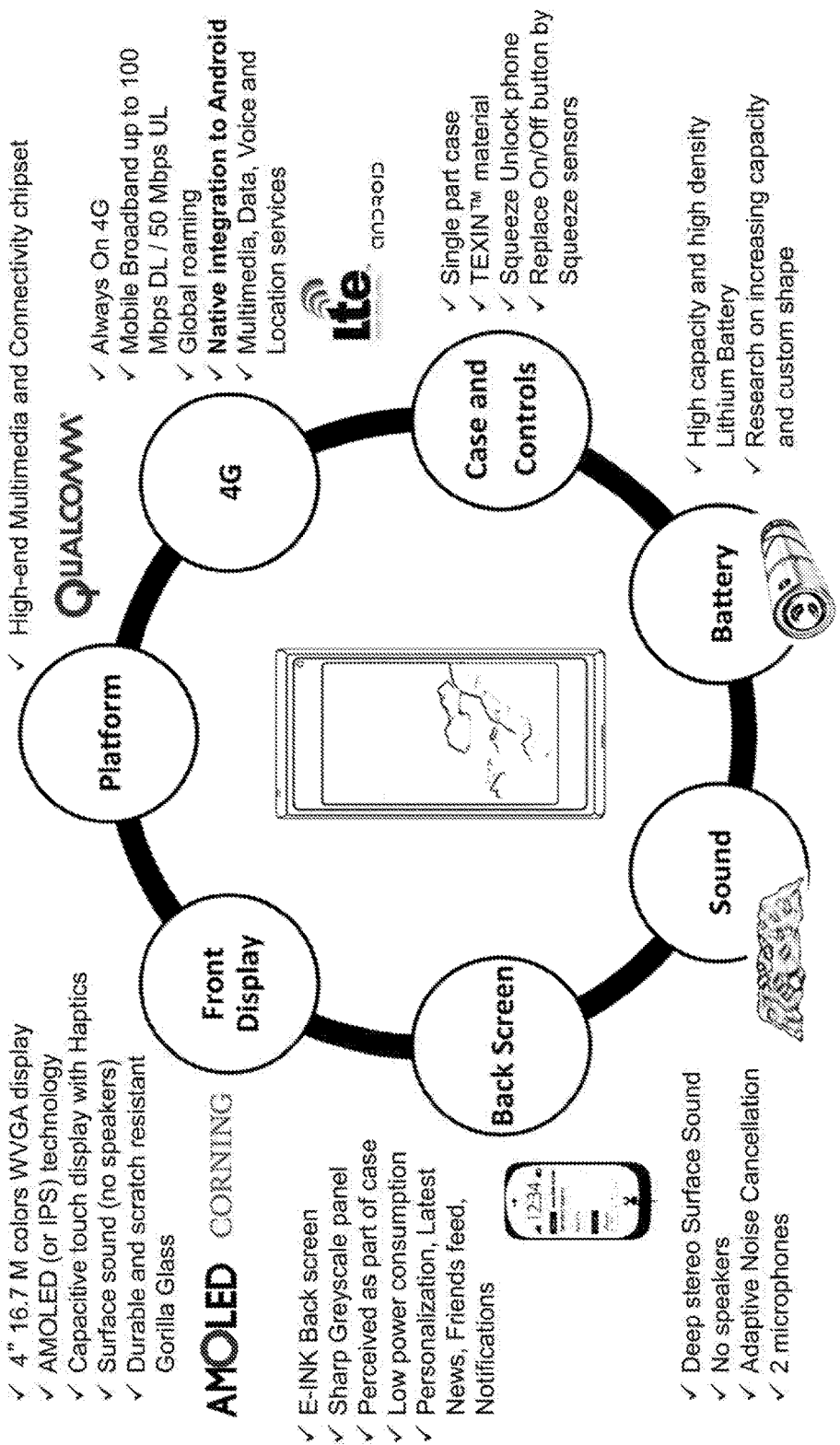
FIG. 5 shows an example of a mobile phone hardware specification.
Figure 8:
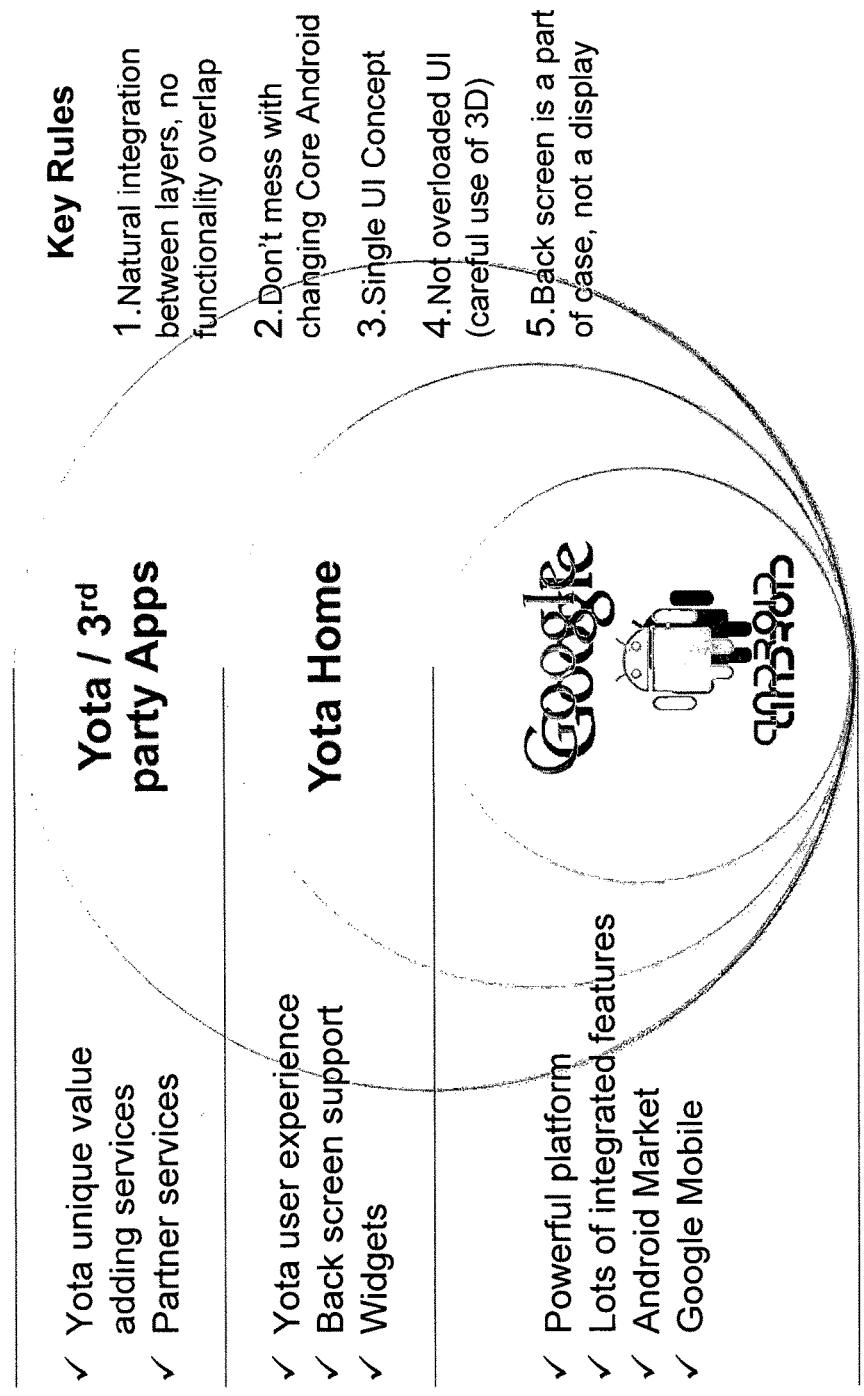
FIG. 8 shows an example software architecture of a mobile device.
Figure 10:
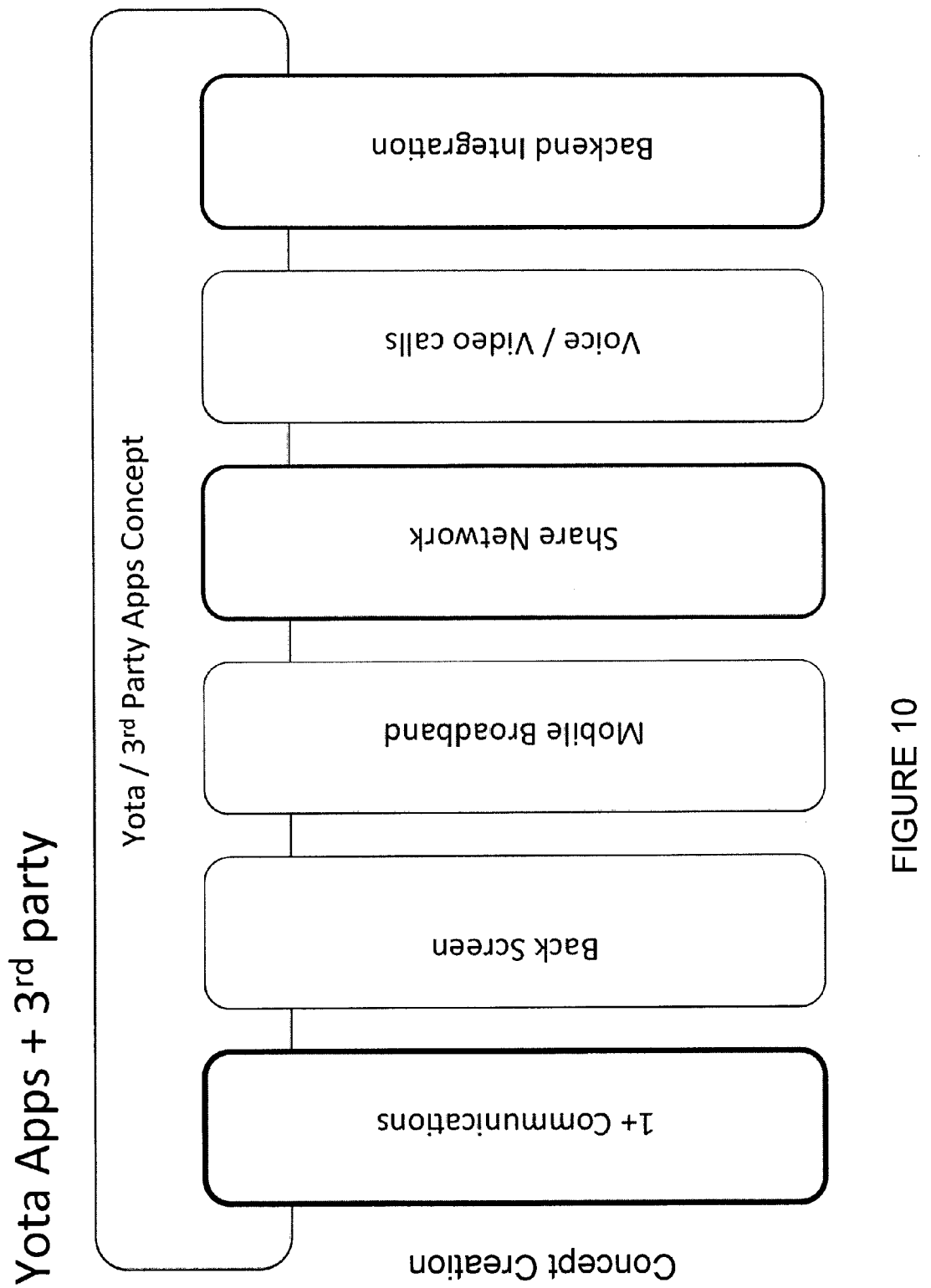
FIG. 10 shows examples of an applications concept for a mobile device.

DML Mobile Device (eg. Mobile Phone) Speaker

It's hard to get good quality audio performance, unless you have a large speaker with a large and ugly speaker hole. We use NXT plc distributed mode loudspeaker (DML) technology here to vibrate the entire mobile device screen (eg. mobile phone screen)—the whole screen surface acts as the speaker. The speaker hole can be fully eliminated. One can use two small drivers/exciters under the screen material (eg. glass) to make the screen vibrate. DML has never been used before to drive a screen surface in a mobile phone. Haptic feedback can be provided by the drivers too—a new use for the DML exciters. When used with appropriate driver modules, a pair of exciters can disperse bending waves evenly across the surface of touch panels so that users experience the effect of depressing mechanical keys when touching the panel surface. The simulated mechanical movement enhances the human interface enabling faster and more accurate keystrokes.

On 20th Dec. 2010 HiWave Technologies PLC, the provider of electronic solutions for audio and haptics, announced that the company name NXT PLC was changed to HiWave Technologies PLC.

FIGS. 44 and 45 show the families of audio exciters available from HiWave. High-Shove Exciters deliver more energy to the surface or panel than standard exciters, and Low Profile Exciters have been developed for the thinnest of applications. Special Use Exciters include robust and ruggedised units.

Haptics may be defined as tactile feedback technology that interacts with a user through his sense of touch by applying force or vibrations to a surface or object. Haptic feedback may be localized to a part of the screen.

Actuators may be provided based on electroactive polymers (EAPs). These are polymers that exhibit a change in size or shape when stimulated by an electric field. Some EAPs can exhibit much larger strains than any ceramic actuator. EAPs have two principal classes: dielectric and ionic. Dielectric EAPs are materials in which actuation is caused by electrostatic forces between two electrodes which squeeze the polymer. Ionic EAPs are materials in which actuation is caused by the displacement of ions inside the polymer.

Mobile device audio properties may be characterized by:
On-board Audio: 128-Voice Polyphony,
QconcertPlus, Dolby 5.1 Surround,
Echo and Noise Cancellation.
Additional ANC (Audience).
1 or 2 Microphones.
NXT display surface sound (No speakers)
Deep stereo Surface Sound
No conventional speakers
Adaptive Noise Cancellation
The case and materials may be characterized by:
Case: Single block
Materials: Plastic or Texin™
The device may have no conventional speaker.

The device may drive only one of a set of actuators under the screen under some circumstances. For example, when a user is making a phone call, only one actuator may be driven, so as to produce sound from only one part of the screen, which may be held next to the user's ear. This helps to keep the sound localized to near the user's ear, which helps to prevent other individuals from hearing the phone call.

The device may be placed face down on a surface such as a table surface. The screen face may then be driven so that sound is emitted not just by the screen, but also by the object whose surface is in contact with the screen. This can help to generate a louder sound output than may be possible from the screen alone.

Prototype Device

It is possible to improve audio quality by selecting a 0.5 mm glass screen thickness instead of a more conventional 0.8 mm.

New actuators: We used new non-led actuators for the prototype that are closer to the mass producible actuator.

New amplifier: The size of the amplifier used in prior tests was too big and a new design was made to be tested in this prototype.

Assembly without visible screws: The design with two displays requires new approaches for assembly. Also the number of screws was minimized. Understanding the robustness and reliability of the highly packed design and the assembly requires prototyping.

Surface material: The device uses Thermoplastic elastomer (TPE) surface material which is not that widely used in this kind of consumer electronics. The effect on wearing can be tested with the prototype. Thermoplastic elastomers (TPE), sometimes referred to as thermoplastic rubbers, are a class of copolymers or a physical mix of polymers (usually a plastic and a rubber) which consist of materials with both thermoplastic and elastomeric properties. Thermoplastic elastomers show both advantages typical of rubbery materials and plastic materials.

Thermal construction: The prototype device incorporates highly packed electronics which will increase the heat production compared to products currently in the market. To distribute the heat evenly and to avoid heat spots the design has an aluminum center part. High surface temperatures were expected due to high amount of current consumed by the electronics and the prototype incorporates heating resistors for the expected amount of device power consumption.

In addition to the aforementioned technologies the mechanics trial prototype can serve as an antenna test and development platform later on.

The prototype integrates the following parts:
Main PCB for the new improved amplifier design and the heating resistors
Small PCB for peripherals like cameras
Flex PCB for interconnecting the rigid PCBs
Floating main window made of gorilla glass with audio actuators
Main cover assembly with main window suspension,
Display
Aluminum center frame,
battery and
gorilla glass back window assembly The following tests were conducted:
Audio performance verification providing information about the performance improvements for changes the display mounting
Frequency response 300 Hz . . . 10 kHz
TotalHarmonicDistortion (THD) 300 Hz . . . 10 kHz
Sound Pressure Level (SPL) with 5% THD
Thermal camera imaging giving understanding of how the heat is distributed around the device.

1. Introduction to the Mechanics Trial Prototype 1.1 Electrical Design

This chapter will give short introduction to the mechanics trial prototype electrical design. The design consists of several entities: engine board, main Flexible Printed Circuit (FPC), battery and audio actuators on display glass.

Figure 16:
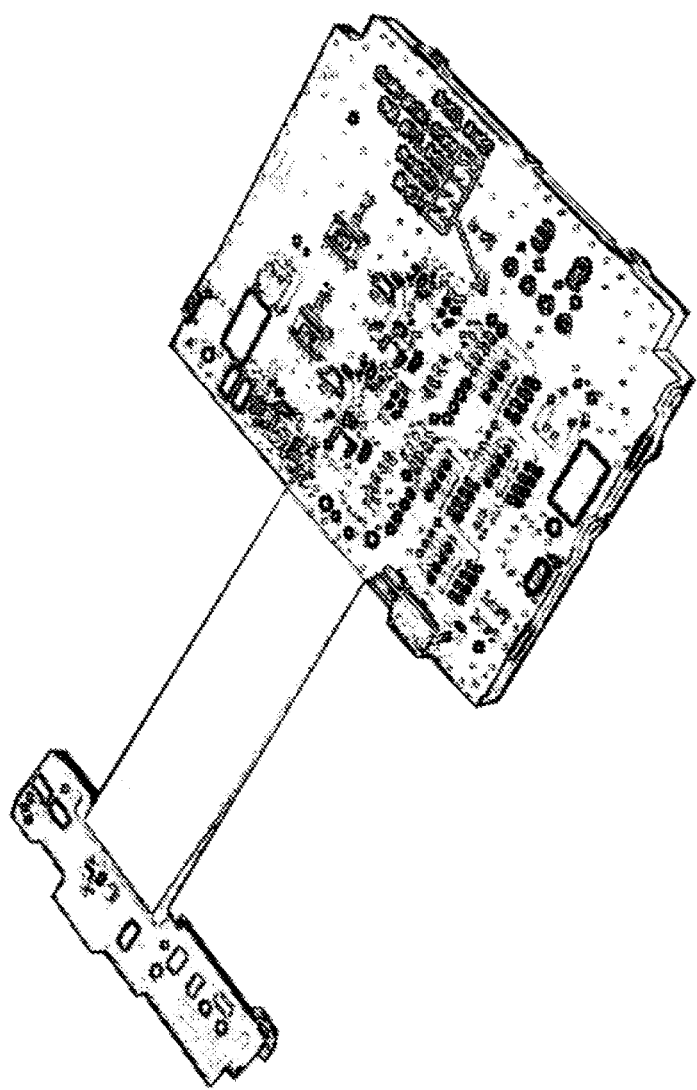
FIG. 16 shows a prototype device engine board with main FPC (bottom side).
Figure 17:
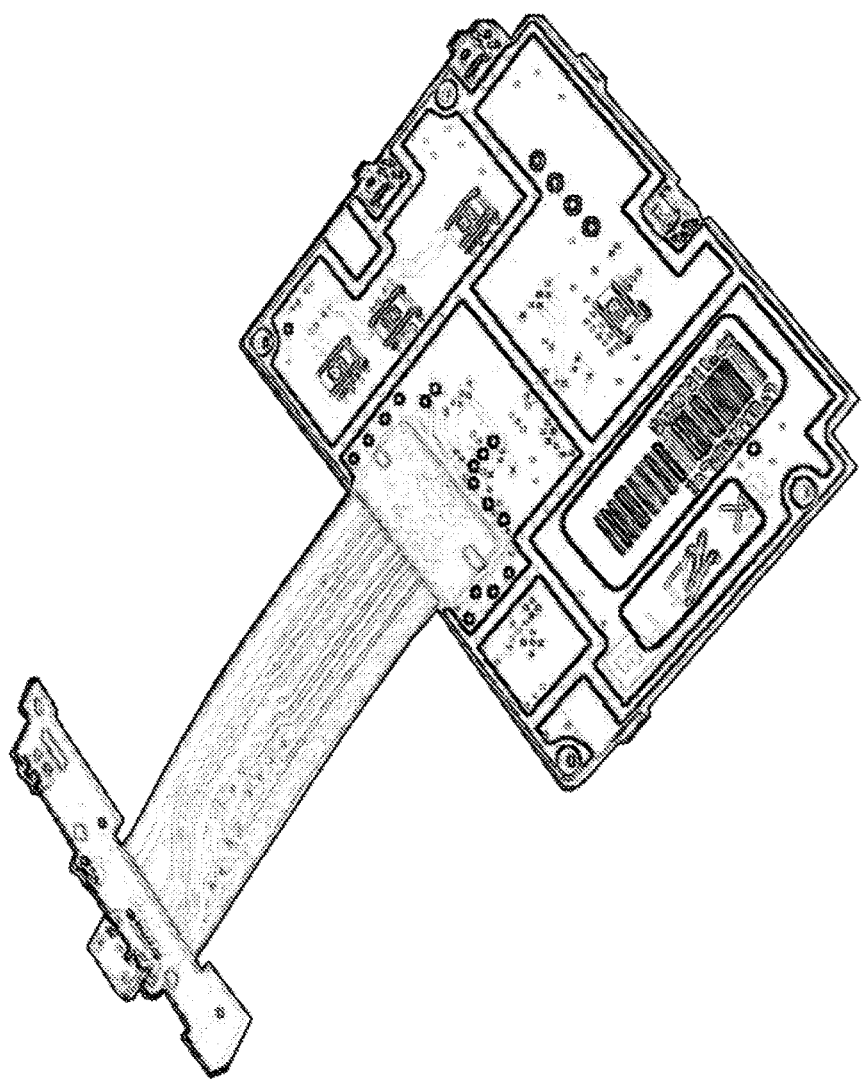
FIG. 17 shows a prototype device engine board with main FPC (top side).
Figure 18:
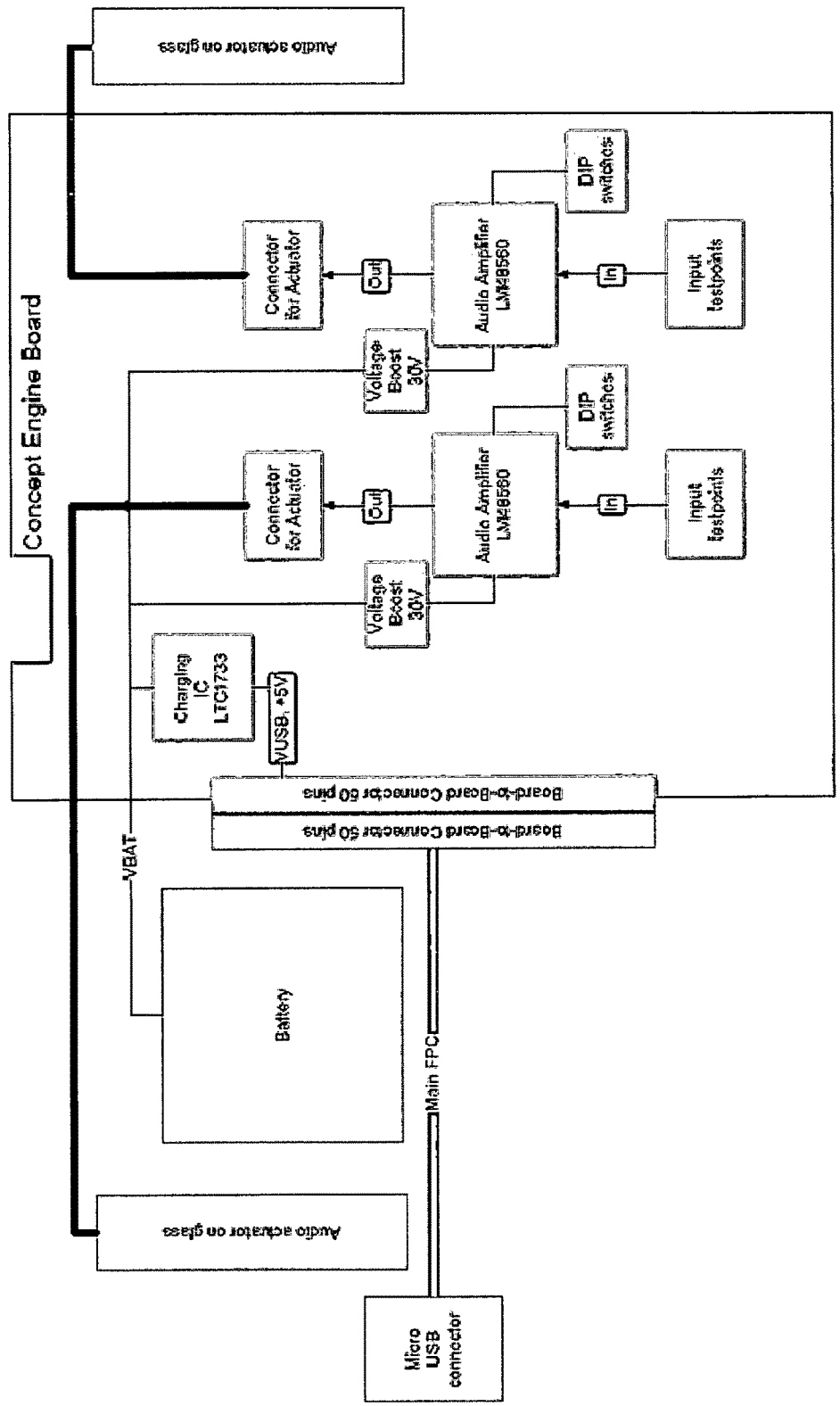
FIG. 18 shows a prototype device trial electrical design block diagram.

The engine board includes the battery charging solution and audio amplifiers. Main FPC connects to the engine board with board-to-FPC connectors and includes Micro USB connector for charging. Battery connects to the engine board with wires. Audio actuators are connected using board-to-wire connectors. Pictures of the engine board with main FPC are seen in FIG. 16 and FIG. 17. Block diagram for the electrical design is presented in FIG. 18.

Figure 19:
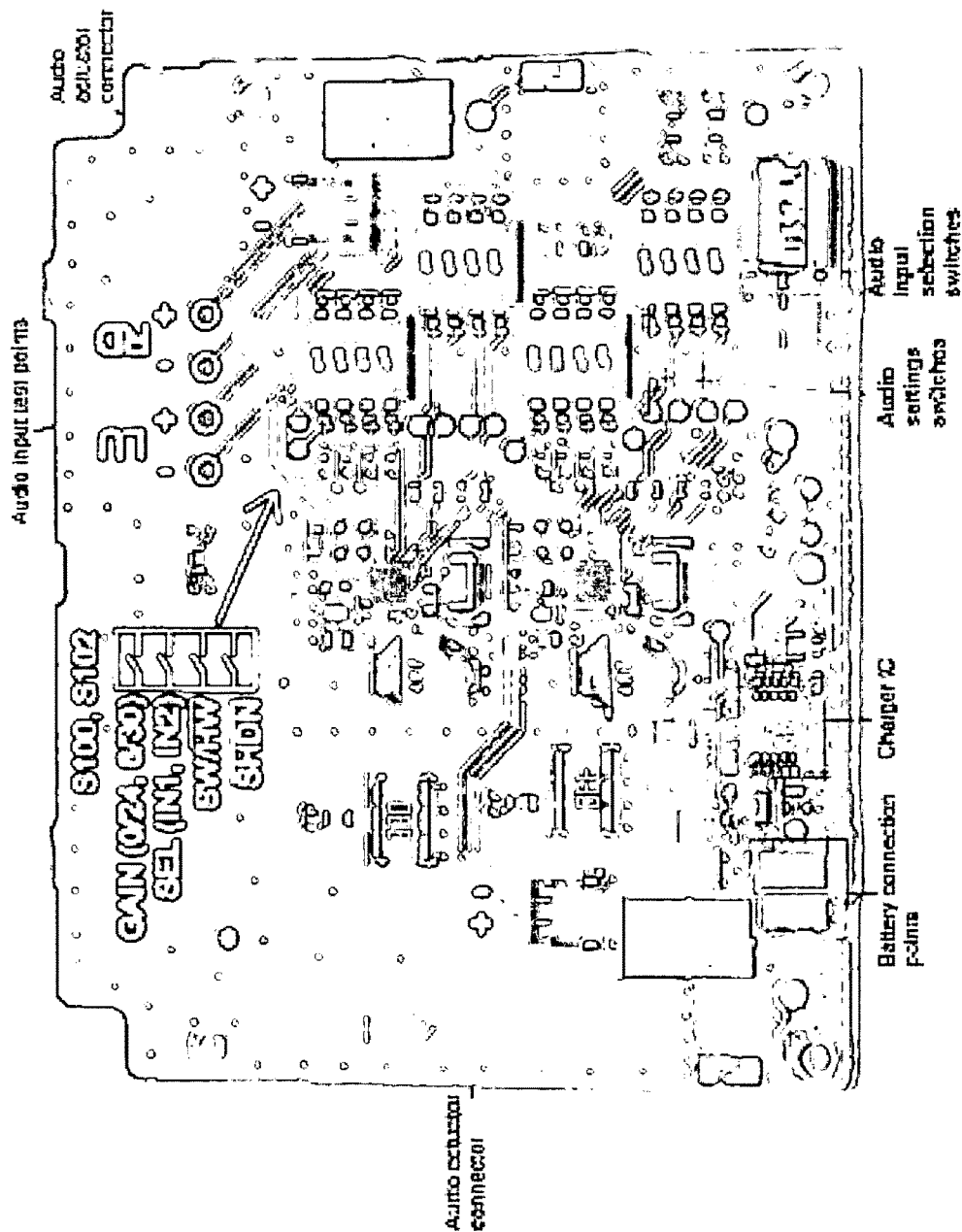
FIG. 19 shows a prototype device engine board details (bottom side).
Figure 20:
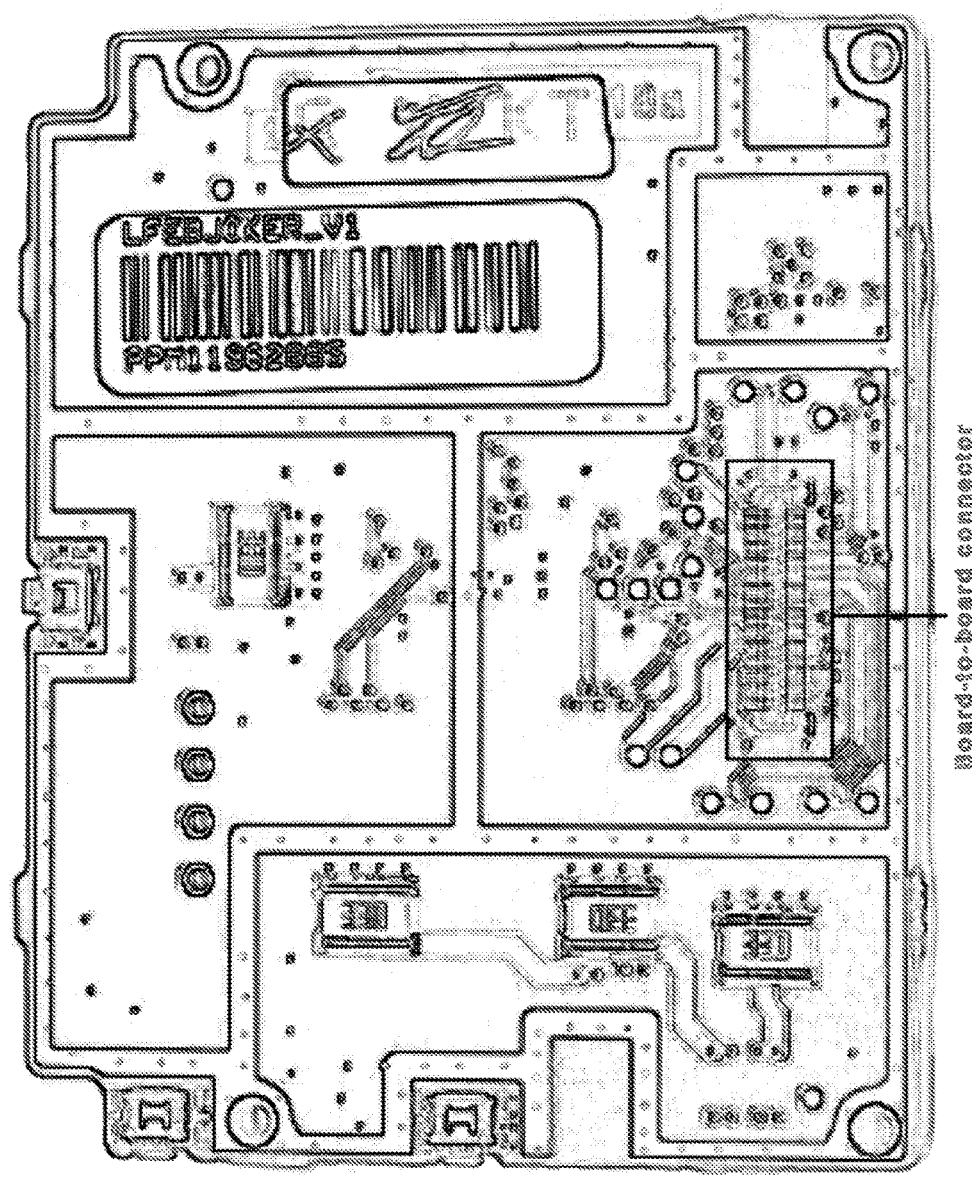
FIG. 20 shows a prototype device engine board details (top side).
Figure 21:
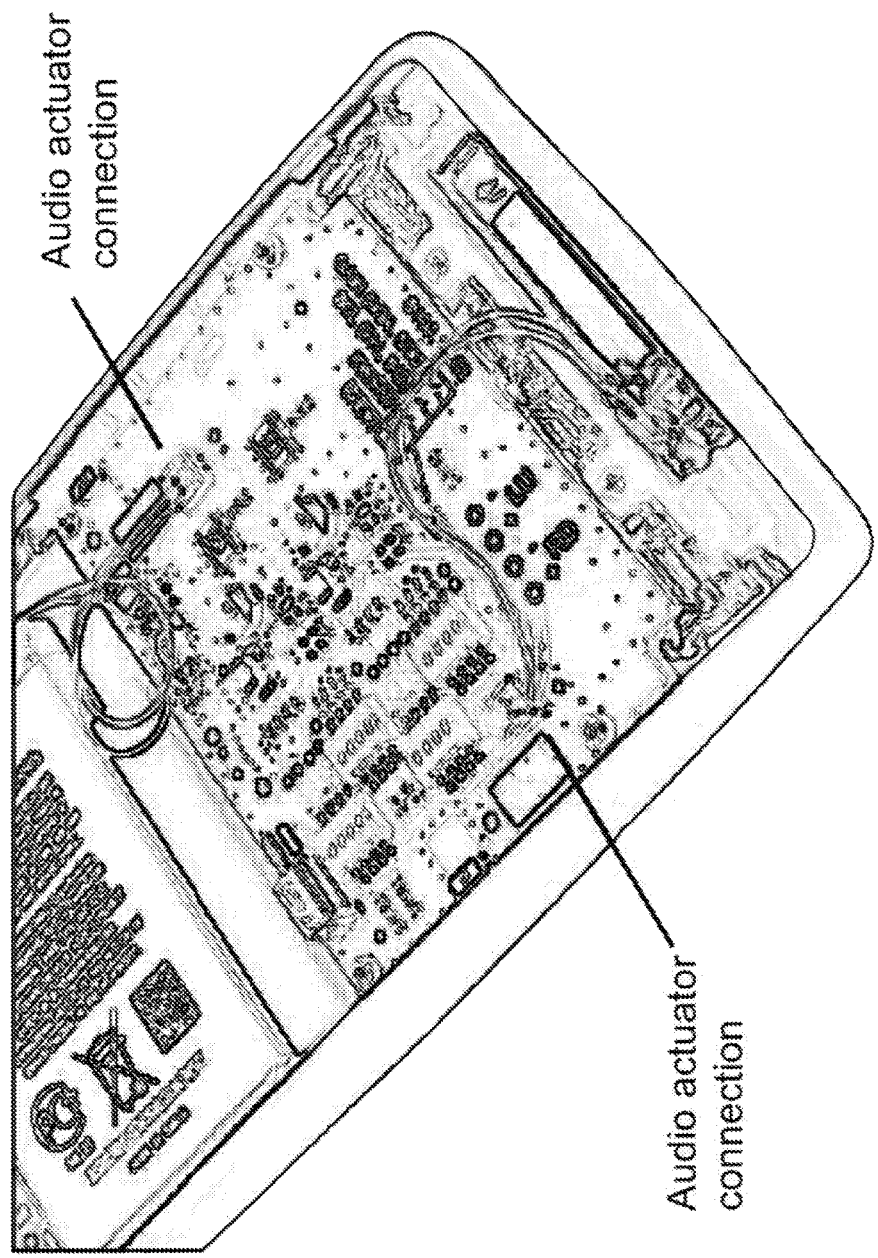
FIG. 21 shows a prototype device engine Board in mechanics.

The electrical design is presented in schematic diagrams of engine board and main FPC. Main engine board details are presented in FIG. 19 and FIG. 20; see also FIG. 21.

Figure 23:
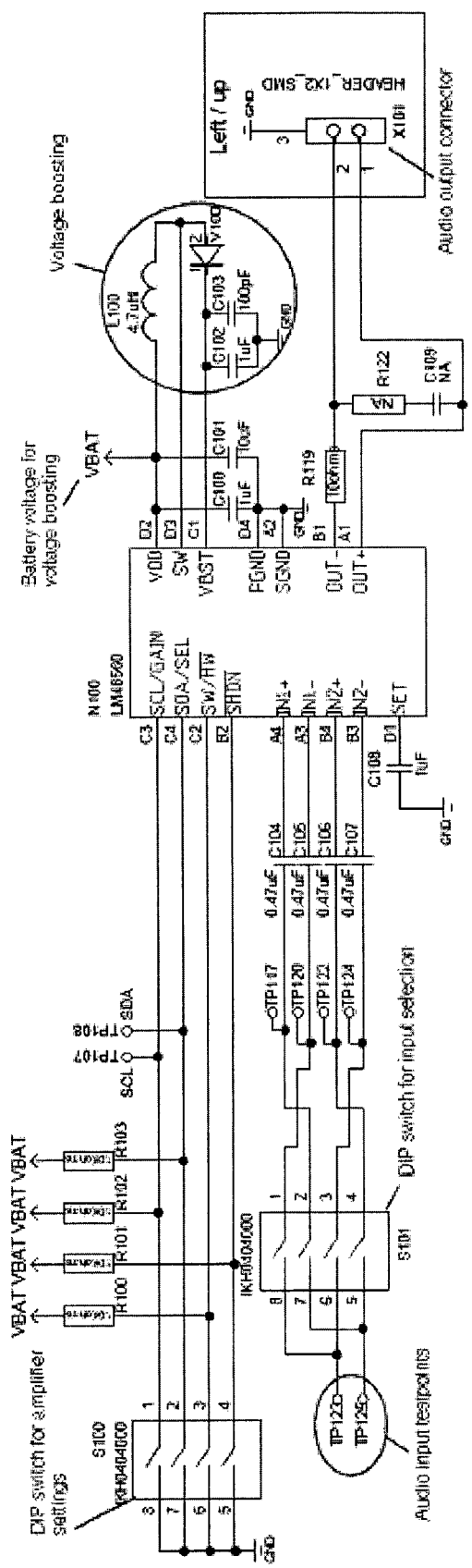
FIG. 23 shows an Amplifier IC schematic.

The main components in the engine board are the two audio amplifiers LM48560 by National Semiconductors. They have the smallest package available for such amplifier. The LM48560 is a high efficiency Class H driver for ceramic speakers and piezo haptic actuators. The external voltage boosting components (coil, diode and capacitor) provide the required 30V driving voltage for the audio actuators from battery voltage. Test points are added for audio input signals and 2-pin connector is added for easy audio actuator output connection. DIP switches are used for amplifier settings and input port selection. DIP switches are described in FIG. 22 and electrical design details are presented in FIG. 23.

Figure 24:
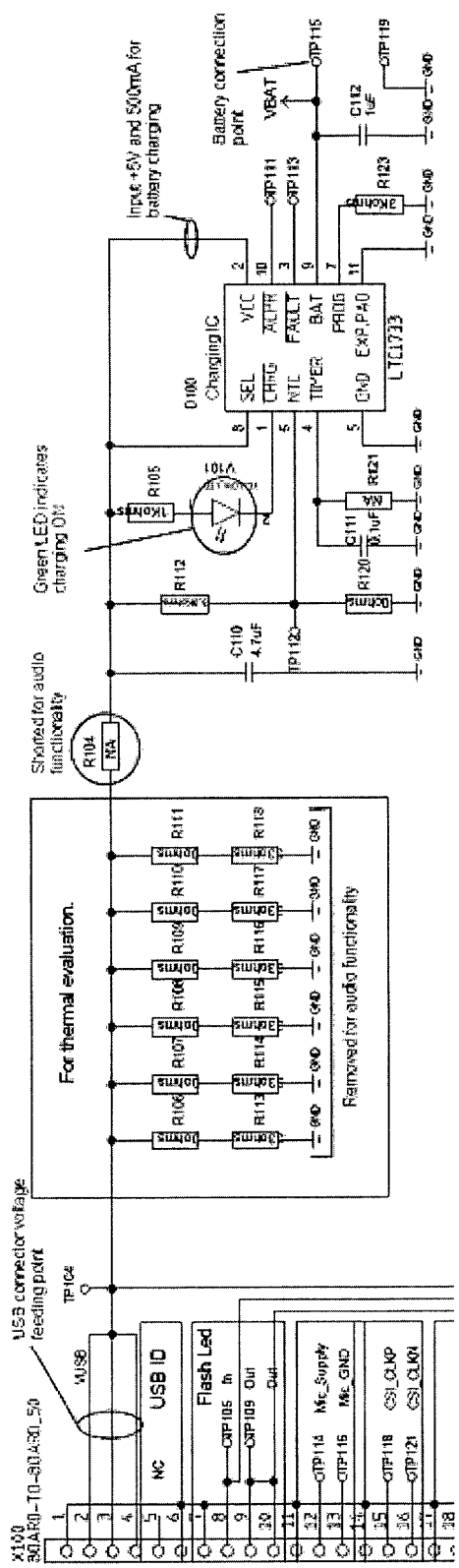
FIG. 24 shows a Charging IC schematic.

As a charging IC, Linear Technology LTC1733 IC is used. It is a stand-alone Li-ion charger with programmable charging current suitable for USB charging. Charging current is set to 500 mA with resistor R123. There is a green LED on board indicating the charging status: when the LED is on, charging is ongoing. See FIG. 24 for charging IC electrical design details.

Figure 25:
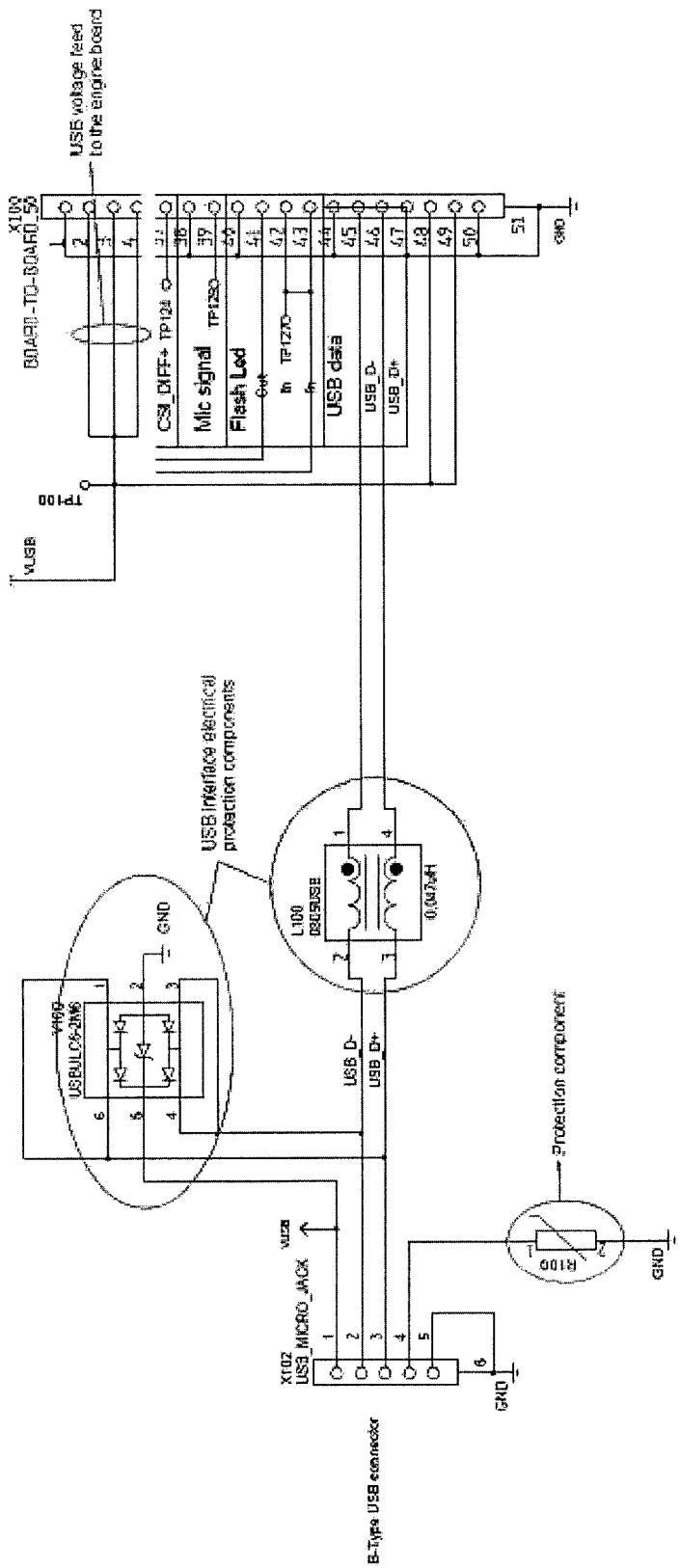
FIG. 25 shows a main FPC schematic.

The main FPC includes the USB connector used for battery charging and board-to-board connector for engine board connection. The USB interface design includes standard protection components for ESD and over voltage protection. The electrical design details are presented in FIG. 25.

The thermal resistors are selected to produce heating 3.25 W power inside the device.

1.2 Mechanics Housing

The mechanics housing represents the latest ID and minimum block created. The size and shape are correct and the materials used are mass producible. The weight is 103 g which is slightly less than the expected weight of the final product. The prototype has no Electrophoretic display (EPD) display assembled. See FIG. 26.

Figure 27:
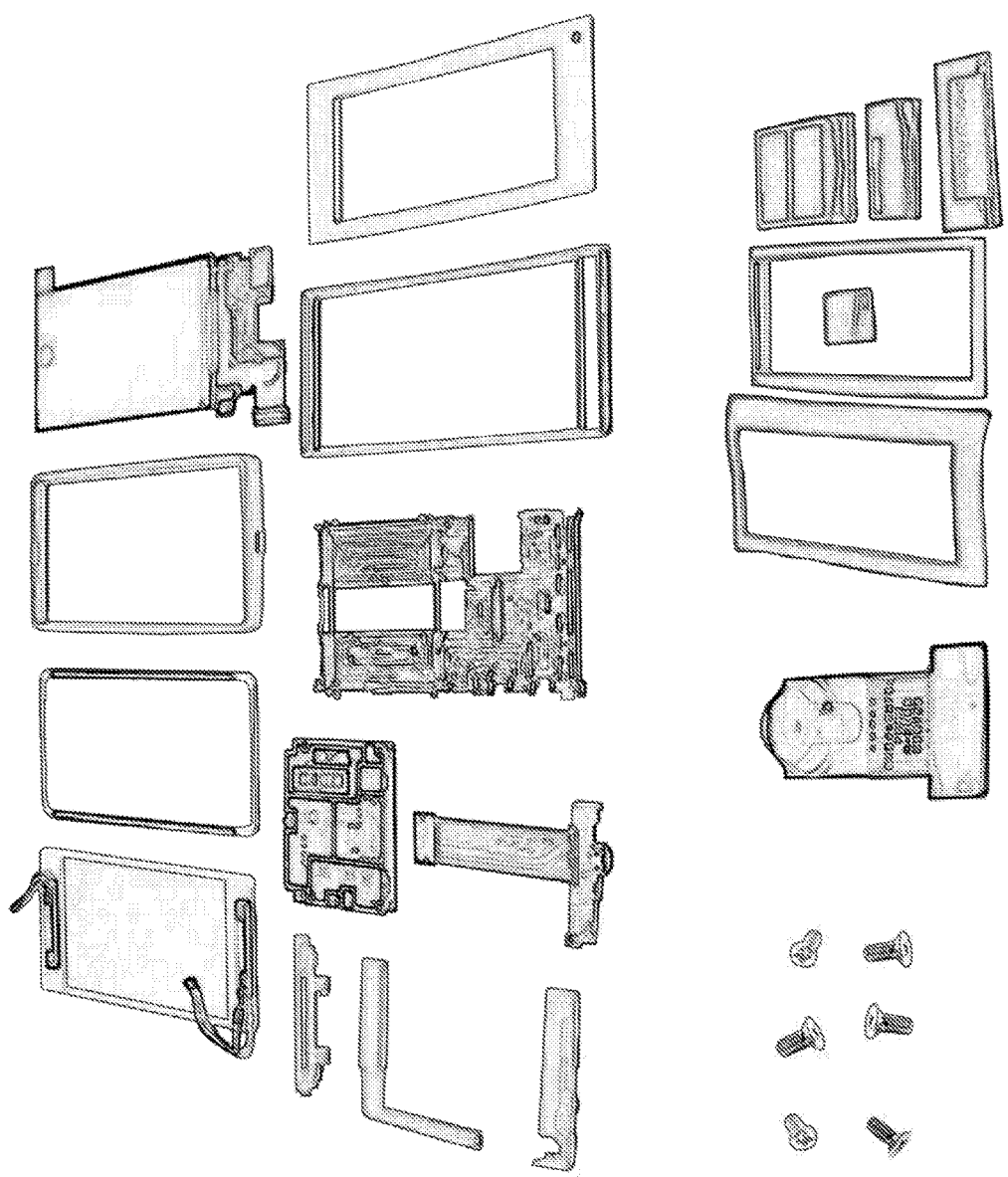
FIG. 27 shows a prototype device's parts.

On a high level the construction consists of (see FIG. 27)
floating main window,
main cover assembly with main window suspension,
display,
aluminum center frame,
engine printed wiring board (PWB) and flex PWB,
battery and
back window assembly.

The design area with most emphasis is the window suspension design. Items that have negligible effect of the results are designed with less detail. For example cover snap-fit locking construction is not final and therefore the covers fixing is backed up with tape on most of the mechanical reliability tests.

Figure 28:
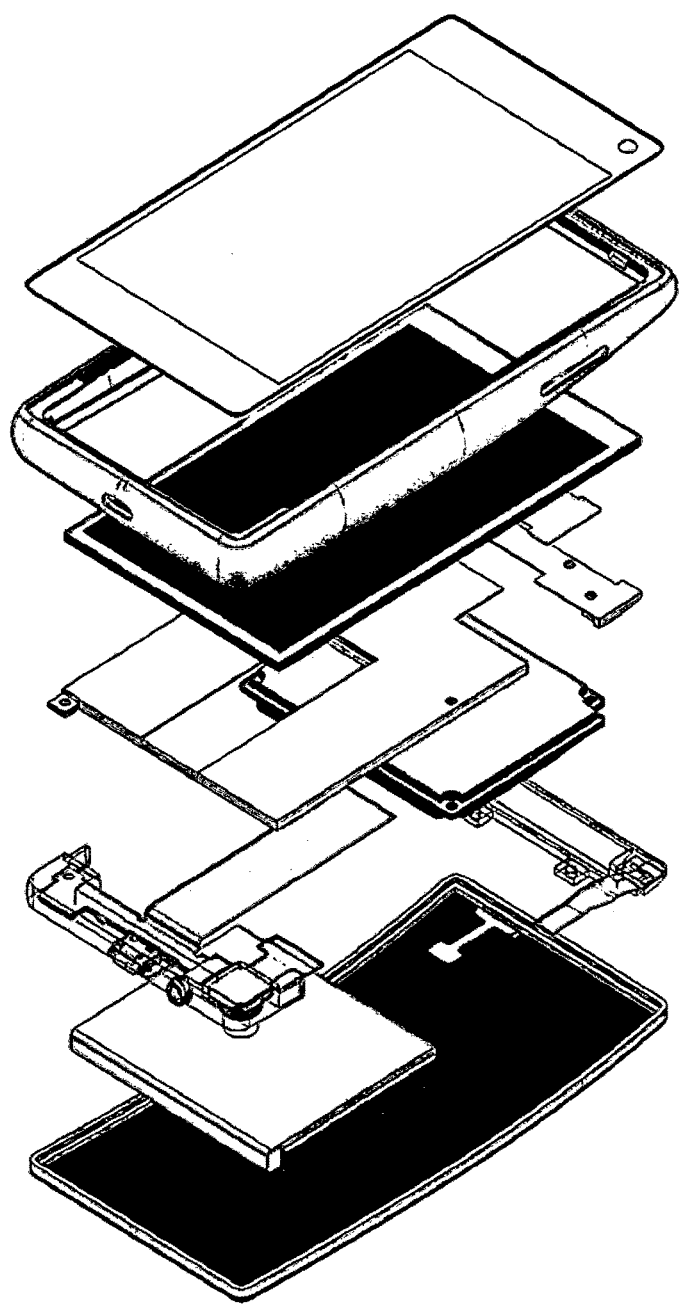
FIG. 28 shows a mechanics breakdown.

The mechanics breakdown is presented in FIG. 28. Materials and suppliers for the mechanics trial prototype are listed in FIG. 29.

1.2.1 Glass Windows

The device has two display windows made of Corning Gorilla glass. For front side a 0.5 mm thick flat Gorilla glass was selected to further minimize the device thickness and to improve the audio performance. However this was against the reliability recommendation to use minimum 0.8 mm thick glass instead. Verifying the reliability of this thin glass is one of the most important targets of the testing rounds. A 0.8 mm thick cylinder curved Gorilla glass was used for the device back side.

1.2.2 Audio Mechanics Design and Window Suspension

There were several alternative ways to construct the window suspension. The following chapters give an overview of the alternatives which were:
Original design proposal
Design proposal 1
Design proposal 2
The selection of the alternative used in the Mechanics Trial and the selection criteria is discussed in 1.2.2.4.

1.2.2.1 Original Design Proposal

Device front window, working as the audio panel, is suspended by soft 0.75 mm thickness gasket material. This soft gasket allows the window to float and it also seals the back cavity. Note that the cover lip under the window is between the display module and the window at left and right side areas of the device. It is part of a critical thickness path of the device (see FIG. 30).

Figure 30:
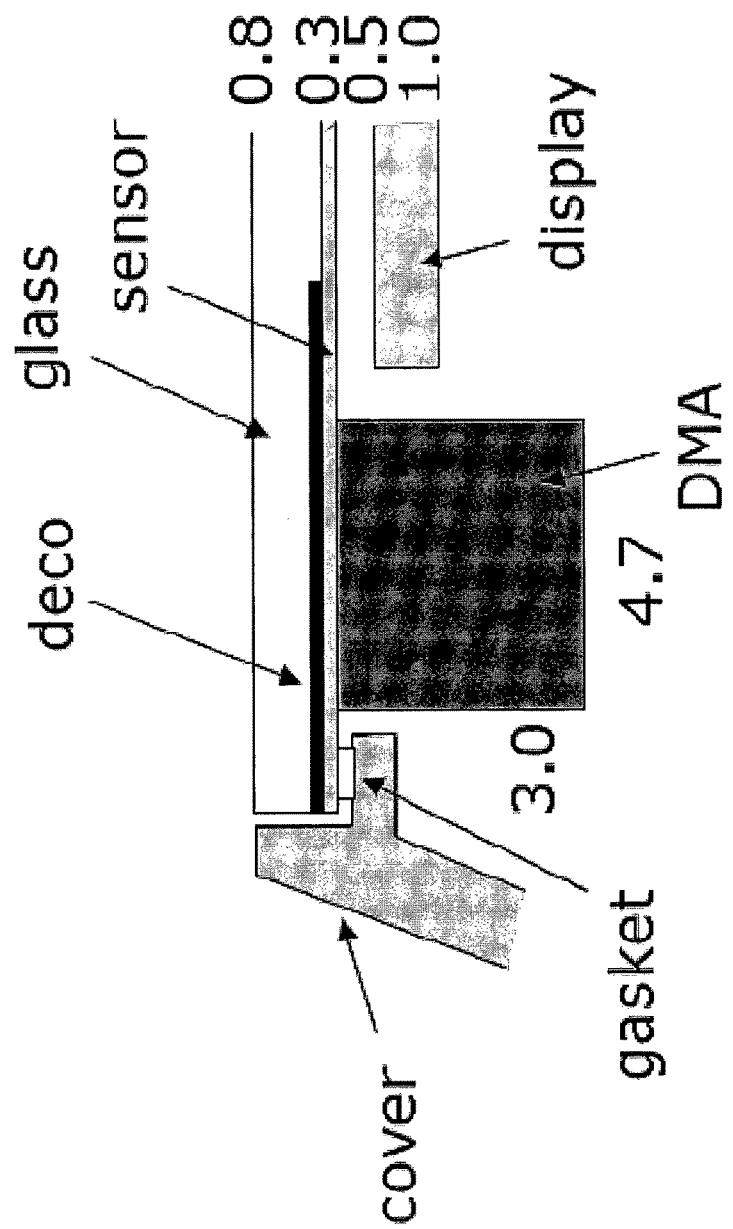
FIG. 30 shows the original design proposal.

DMA components on the bottom and top end of device are be fixed by adhesive tapes to the bottom of the front window capacitive sensor sheet (see FIG. 30). This type of DMA fixing is used for other window suspension constructions too.

The construction pros & cons are:
+Verified window suspension construction
+Robust back cavity air shielding
−Thickest construction
−Limiting ID design many ways due to gasket minimum width etc 1.2.2.2 Design Proposal 1

Figure 31:
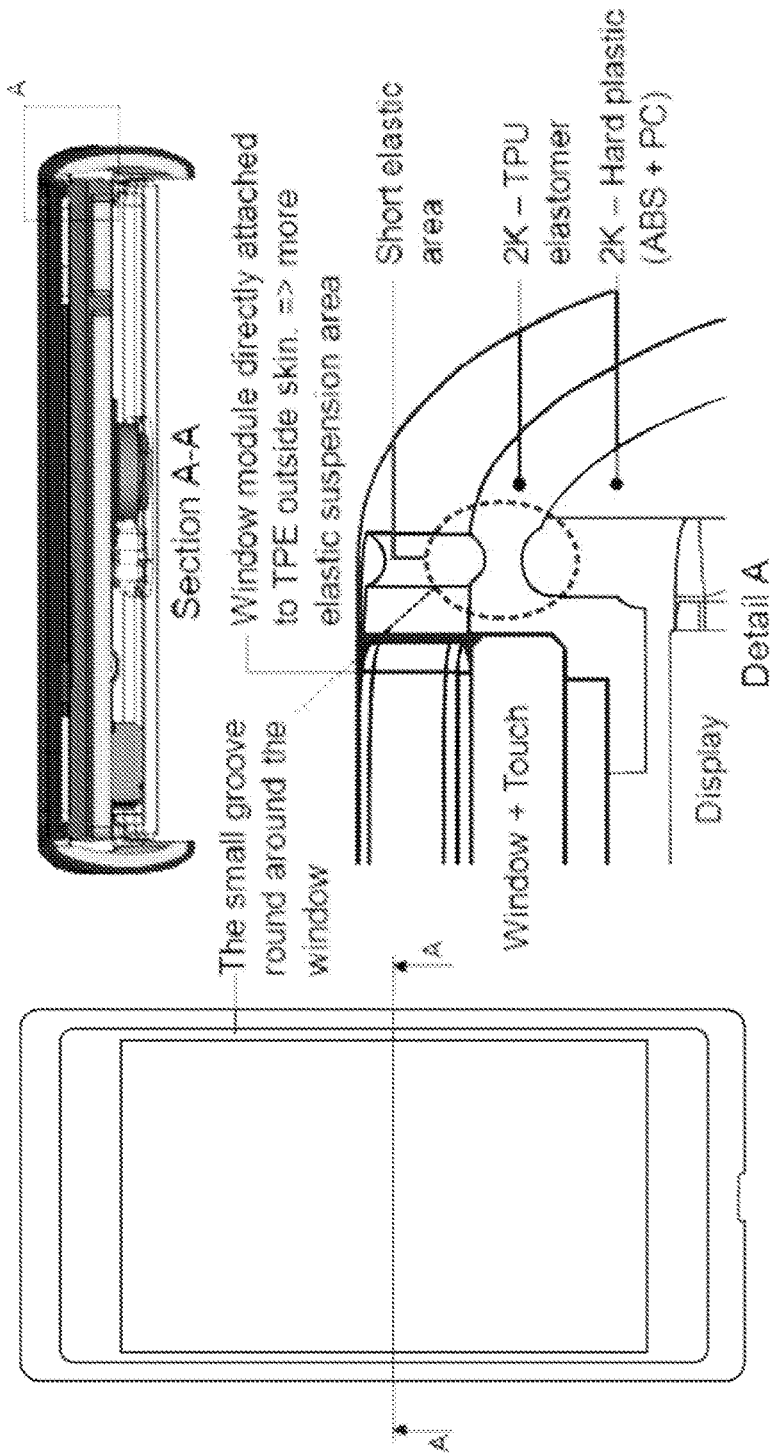
FIG. 31 shows Design Proposal 1.

See FIG. 31. The front window suspension is designed by using soft TPE material top of device side walls. TPE comes under the window and the window is fixed to it by glue or adhesive. Window suspension parameters can be adjusted by a short elastic area of TPE near of the window side edges (see FIG. 31). At the same time soft TPE works as a back cavity air gasket.

The construction pros & cons are:
+Approximately 1 mm thinner construction than earlier proposal
+Back cavity shielding
+More rigid mechanical design
−Technical relation between ID design and audio features of soft cover material (TPE)
−More rigid mechanical construction affects audio performance
−Window fixing on top of the soft TPE material would be an issue 1.2.2.3 Design Proposal 2

Figure 32:
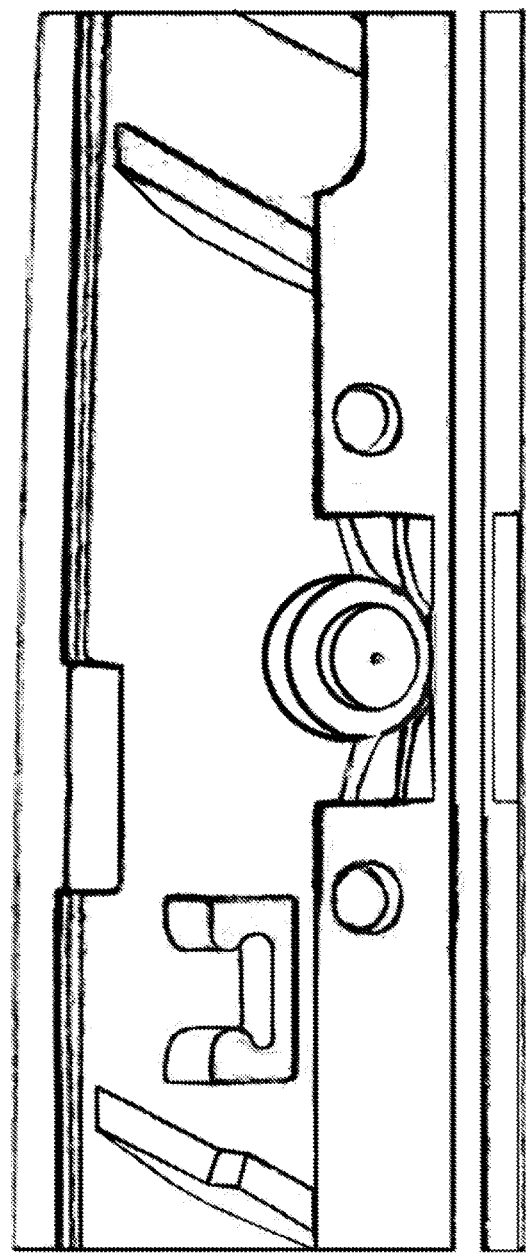
FIG. 32 shows Design proposal 2: Window suspension element.
Figure 33:
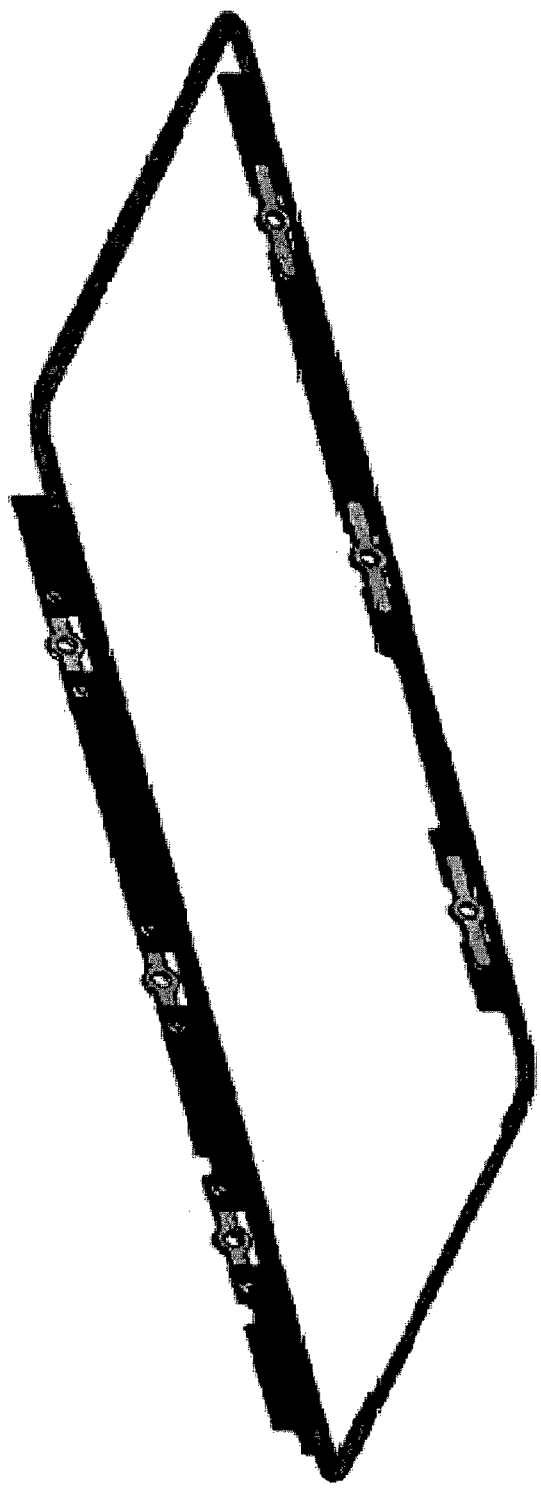
FIG. 33 shows Front window fixing frame including suspension elements (6 pcs)
Figure 34:
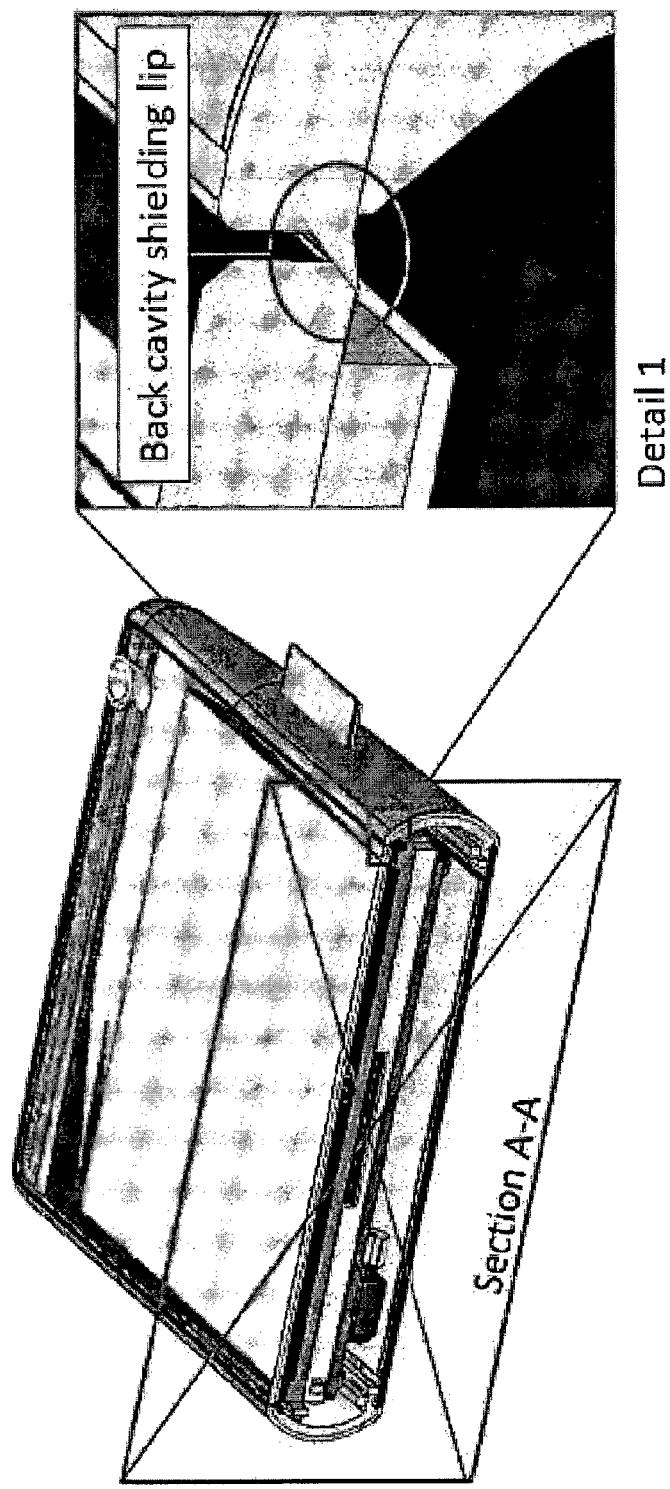
FIG. 34 shows Design proposal 2: Back cavity shielding.

See FIGS. 32, 33 and 34. Front window suspension is designed by using a window frame. Window is fixed to the frame constantly by adhesive tape. There are six window suspension elements between the frame and side walls of the device in the design (see FIG. 33). Suspension elements are moulded from TPE material of shore 80 A stiffness. The device side walls left and right have soft back cavity shielding lips isolating back cavity from the free front side.

The construction pros & cons are:
+Approximately 1 mm thinner construction than earlier proposal
+Fully floating front window, expected better audio performance
+Window suspension will been easily adjust by a separate suspension elements (see FIG. 33)
+No relation between ID design and technical features
−Back cavity shielding will be difficult to handle
−Fully floating window suspension makes challenges to overall robustness of the device 1.2.2.4 Decision Design proposal 2 was selected for mechanical trial as the most viable solution for ID and audio performance.

2. Aidio Verification 2.1 Test Cases & Requirements

Frequency response, Total Harmonic Distortion (THD) and maximum sound pressure at 5% THD is measured in loudspeaker mode. The amplifier is also evaluated for maximum output level as a new amplifier design is used to save space. Previous aluminium prototype is also evaluated for reference with the new amplifier design to obtain best possible comparability.

The target is to reach similar loudness level as in products on the market in this category. Samsung Galaxy S has been used as a reference. Cellular phone type approval sets requirements for loudness in handset mode (phone held against the ear) which was not evaluated in this case. The reason behind is discussed more precisely in the conclusions chapter.

Figure 35:
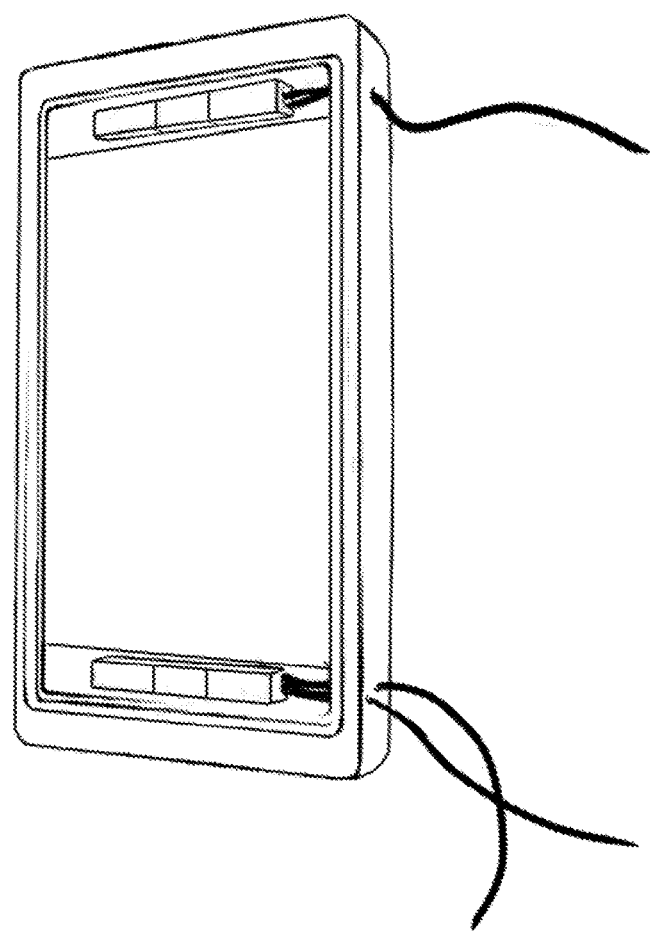
FIG. 35 shows an Aluminum prototype.

The measurements for aluminium audio prototype (FIG. 35) created in October 2010 showed the following conclusions
  slightly better THD performance than reference Samsung Galaxy S
  sensitivity peaks at 4 kHz in speaker mode
    Low frequencies are attenuated more than with dynamic speakers
    Due to missing low frequency content intelligibility is reduced
    Considerable equalization is needed to balance the frequency response 2.2 Test Setup The prototype is placed in an anechoic chamber and acoustic output is measured with both channels driven by the internal amplifier. Microphone is placed on 10 cm distance from the center of display.

Acoustic output from prototype is measured with B&K 4190 free-field microphone with Nexus signal intensity conditioning amplifier. Audio Precision AP-2522 analyzer records the level and the THD.

2.3 Test Results 2.3.1 Amplifier Maximum Output Level

According to the specification the amplifier is able to drive 30Vp-p signal to load. Because of untraditional characteristics for load (capacitive), maximum undistorted output from amplifier was measured with pietzo actuators. Additionally, both, amplifier and the used transducer technology are better to be evaluated as a one-package since amplifier solutions may vary due to not being mass production item thus far.

Figure 36:
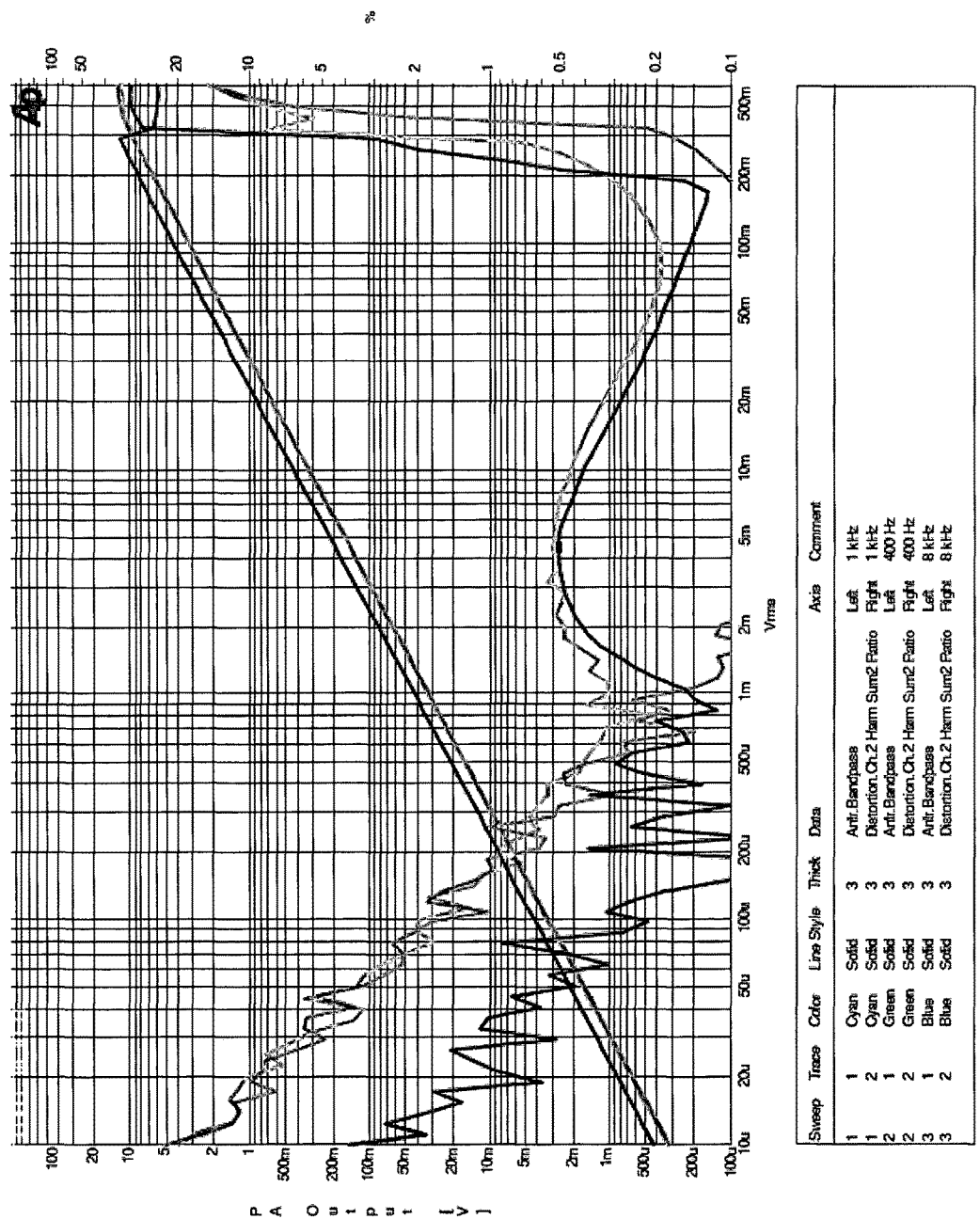
FIG. 36 shows H-Class Amplifier Linearity.

See FIG. 36. Both actuators were driven with same signal (as double mono). Signal starts clipping with 150 . . . 320 mVrms input signal (from X-axis) at output level of 8 . . . 10 Vrms (left Y-axis). Distortion is well below 1% before clipping (right Y-axis). Charger was connected and battery fully charged during the test.

The results show that the amplifier meets the requirements for the device design.

2.3.2 Frequency Response

The aluminium prototype presented earlier in the document showed lack of sensitivity especially on lower frequencies.

Improvement in mechanics trial prototype was sought by changing mechanical properties of the glass suspension. Measurement environment remained unchanged. Mechanics Trial frequency response is measured in ¹⁄₂₄th octave bands with 100 mVrms input to amplifier (3.2 Vrms output from amplifier). Distance of measurement microphone from the centre of display is 0.1 m.

The first results showed bad performance which was found out to be due to air leakage between the glass and the mechanics. The leakage was blocked by gluing the glass to the frame with silicone and the back cover was changed into a glass instead of plastic and the measurement was repeated. Results show significant increase in sensitivity. Back cover glass was also sealed with blue-tag to allow re-opening, but also to make sure maximal sealing for retake correlation between measurements.

Figure 37:
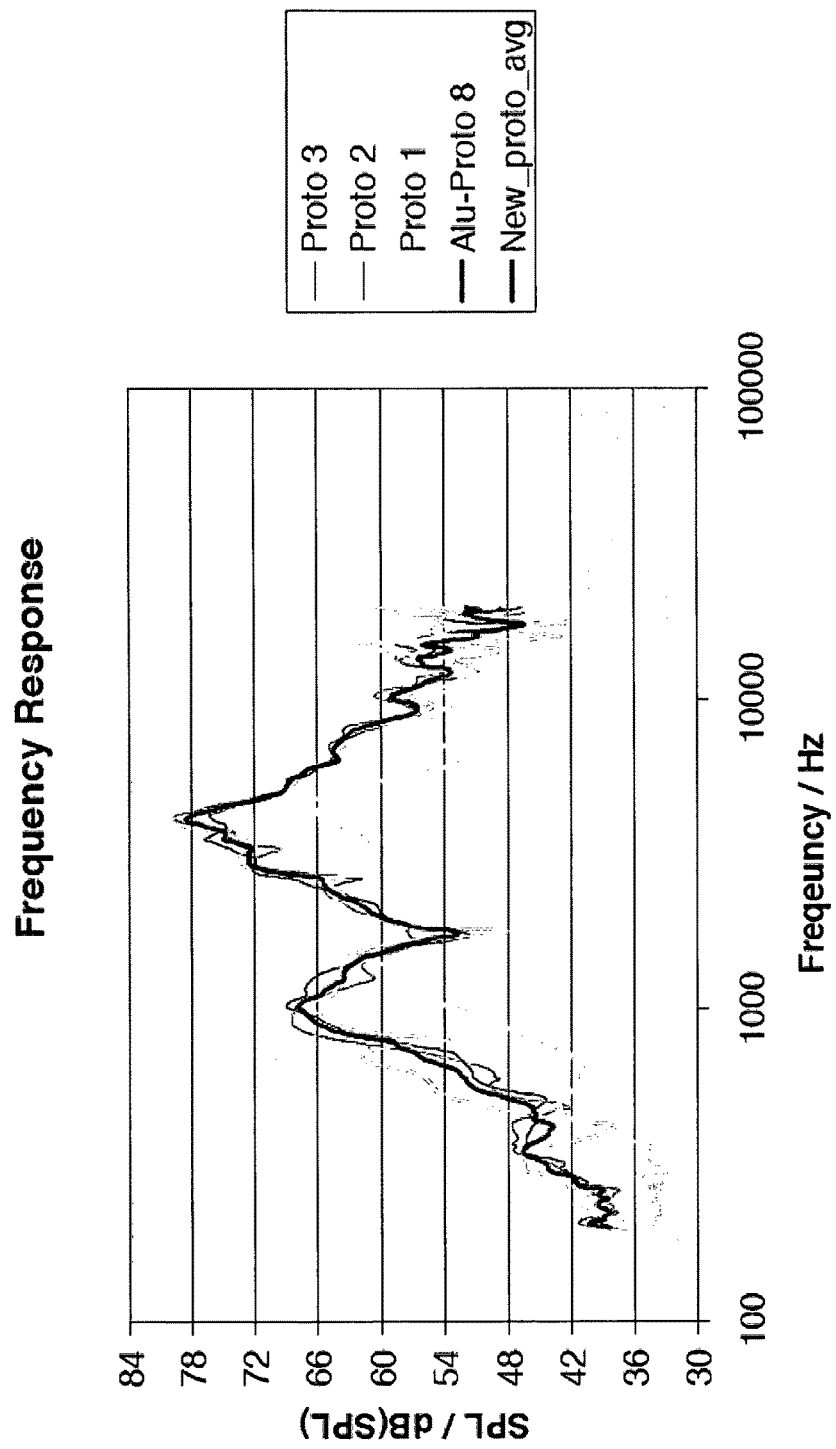
FIG. 37 shows Frequency Response: Prototypes sealed with silicone compared to representative aluminium prototype @100 mVrms.

See FIG. 37. The measurement results show that the air volume behind the glass must be properly sealed. The selected mechanics structure does not perform better than the aluminium prototype. In fact it seems that system tuning is not optimum which requires further development. Also noteworthy is that between the prototypes many parameters were changed which anticipate a lot of prototyping to be required to perfect the design.

Figure 38:
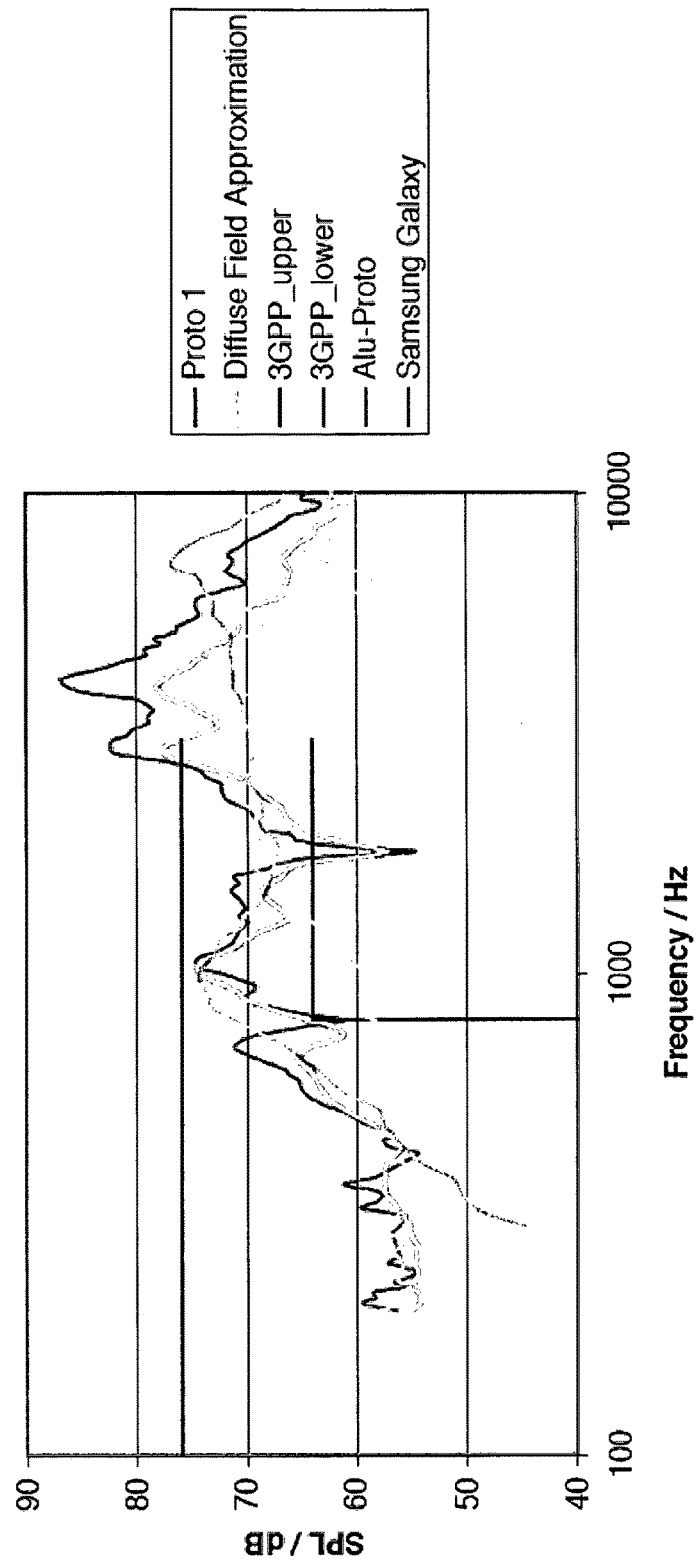
FIG. 38 shows Glass-Sound Protypes compared to 3GPP Hand Held Hands-Free Mask.
Figure 39:
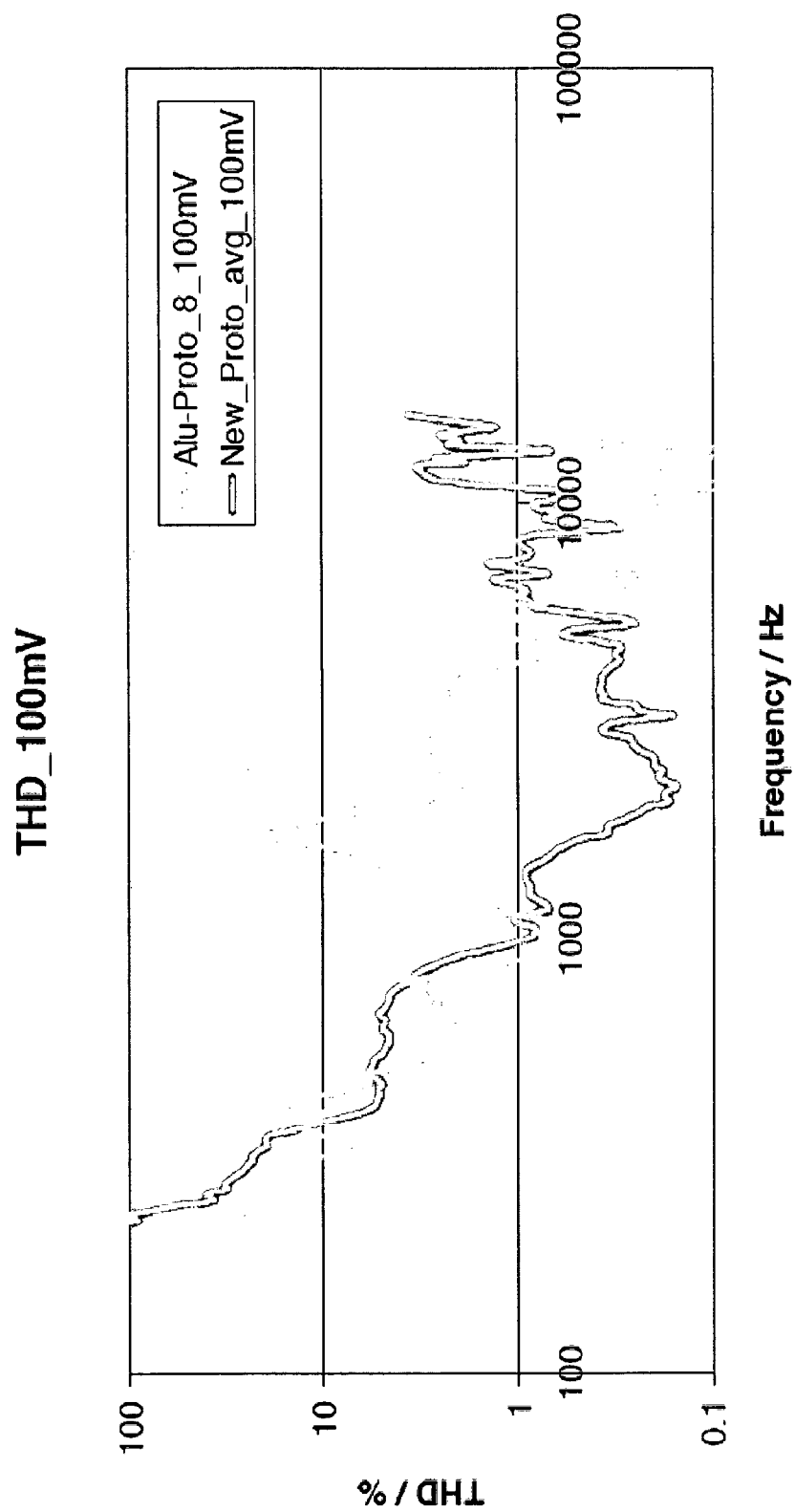
FIG. 39 shows THD with 100 mV input: average silicone sealed proto compared to representative aluminium-prototype.
Figure 40:
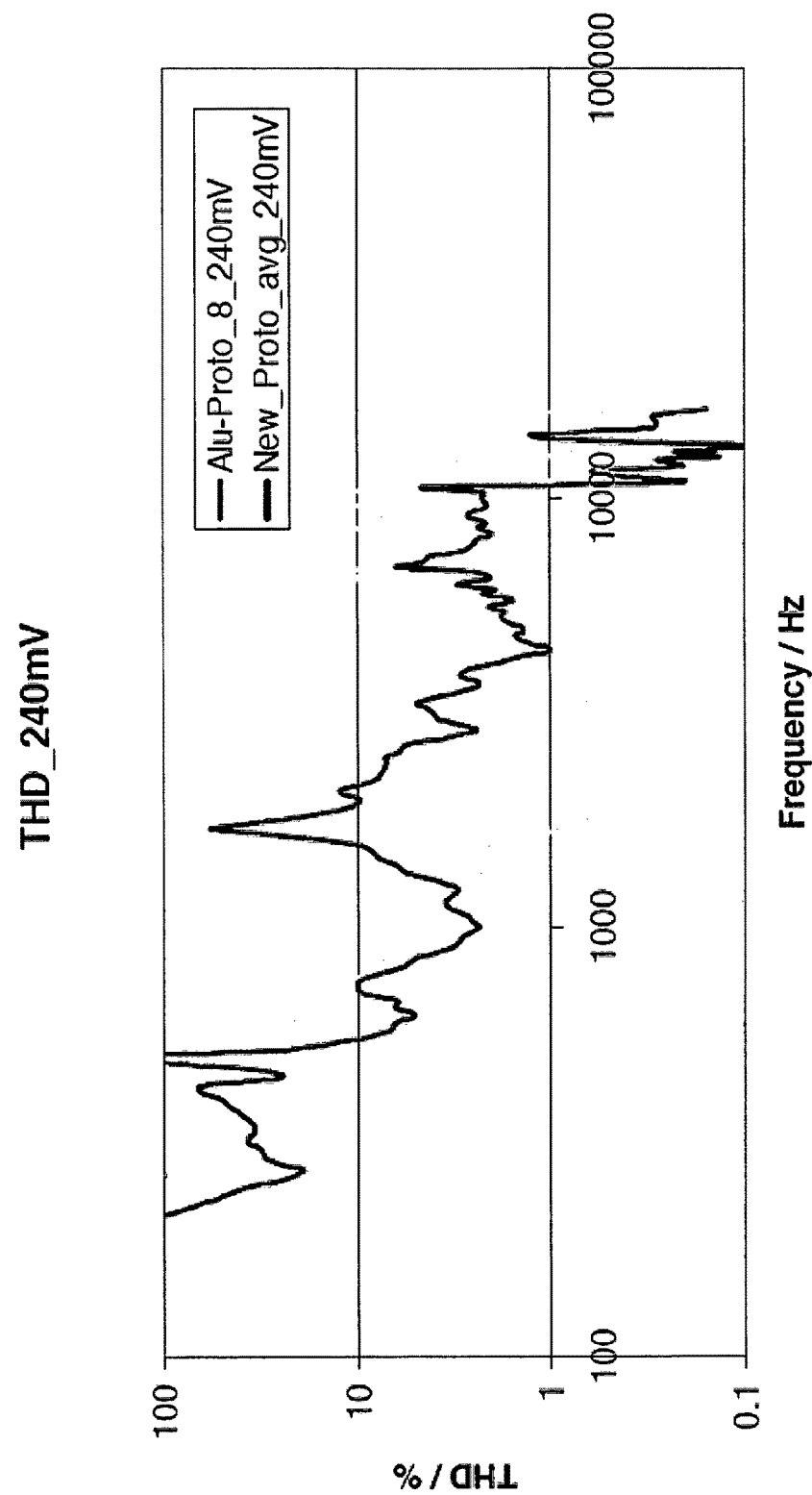
FIG. 40 shows THD with 240 mV input: average silicone sealed proto compared to representative aluminium-prototype.
Figure 41:
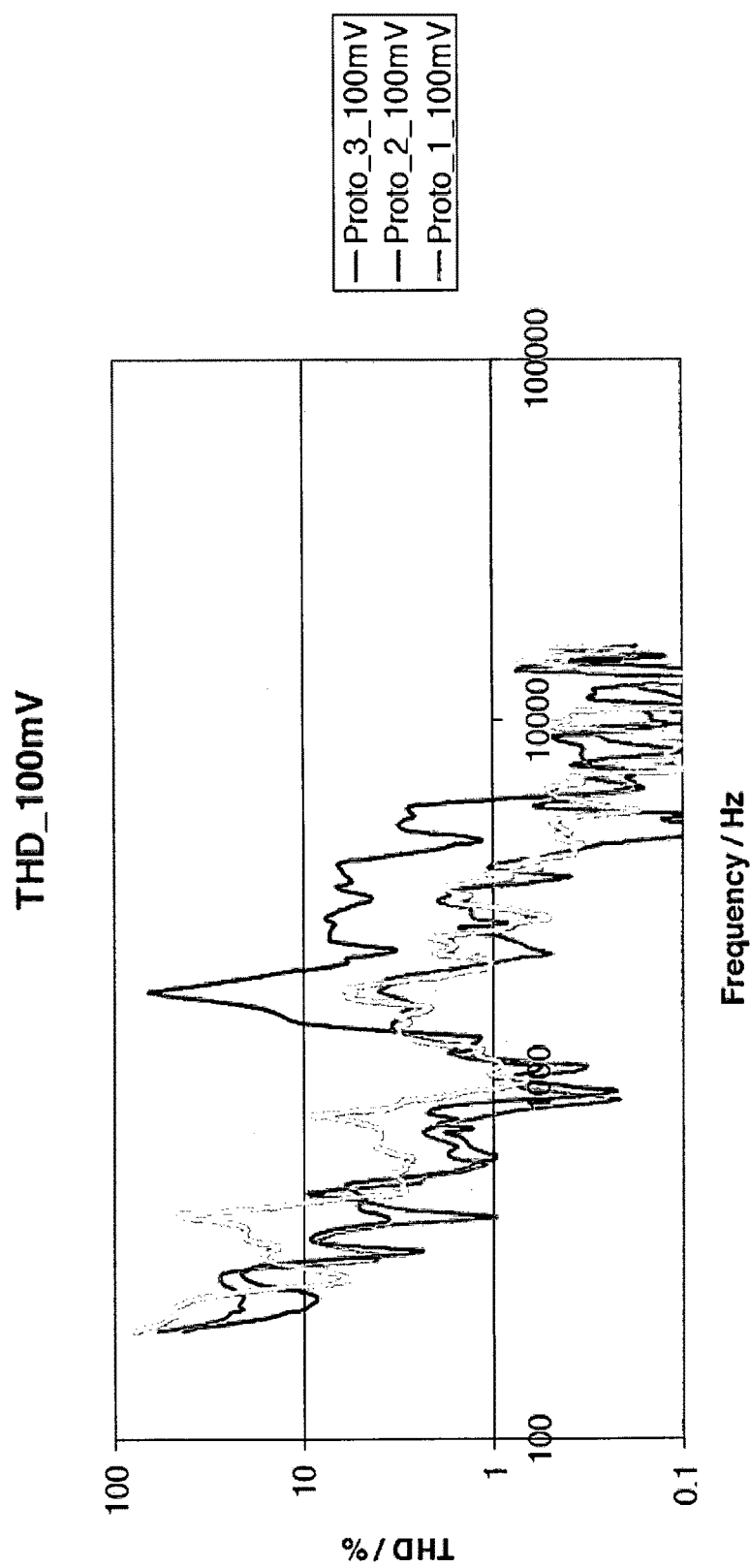
FIG. 41 shows THD with 100 mV input: silicone sealed prototypes.
Figure 42:
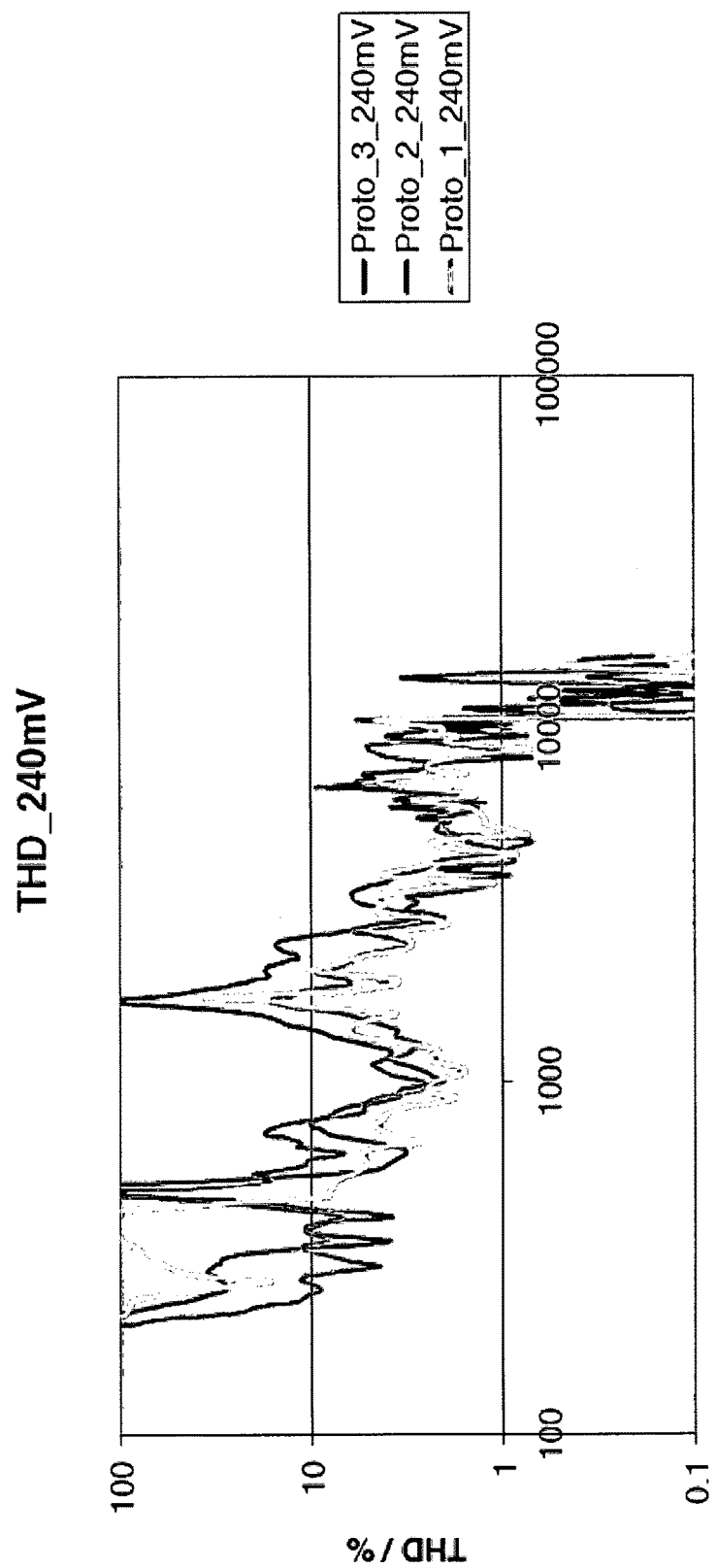
FIG. 42 shows THD with 240 mV input: silicone sealed prototypes.

FIG. 38 compares Glass-Sound prototypes against Hand Held Hands-Free Mask by 3GPP that is not mandatory in most of regions, but is quite doable for an ordinary premium mobile phone and was added as a reference. Aluminium prototype fails due to lack of low frequencies, but on the other hand, does not overlap because of resonances.

2.3.3 Sensitivity of six Mechanic Trial units

The sensitivity measurement was found improper for the purpose. If the GlassSound is measured too close the result will be much worse that from a distance. The results are not shown as they give not valuable information.

2.3.4 THD of Three Mechanic Trial Units

FIG. 39, FIG. 40, FIG. 41 and FIG. 42 depict THD characteristics for measured prototypes. An average new proto achieves quite the same THD levels for lower than 1 kHz frequencies as aluminium prototype. On higher frequencies being most important for intelligibility the system fundamental tuning frequency comes into play and distorts the signal. All the three devices show similar trend, but proto 3 revealed intolerable amount of distortion within 1-6 kHz. THD is well damped with high frequencies for 100 mV input, but new prototypes yield more added distortion as input is increased to amplifier linear input full scale.

THD graph points to the same resonances as the frequency response. This suggests that the system needs to be tuned further.

All silicone sealed prototypes were re-checked for leaks, but distortion problems for prototype number 3 raise a question if something went wrong with either one of the piezo's or with the whole resonator system assembly. This further leads to asking how this kind of assembly can be polished to of a mass-production quality and to compete with dynamic speaker solution.

Increase in THD is at expected level with maximum input to amplifier and sharp peaks can be avoided with proper tuning. Overall THD performance is not as good as with an average dynamic speaker, but adequate for the purpose. End user might not notice the difference—if peaks are counted out—but THD might be a stepping stone in regulative acceptance perspective.

2.3.5 Sound Pressure Limited to 5% THD

Figure 43:
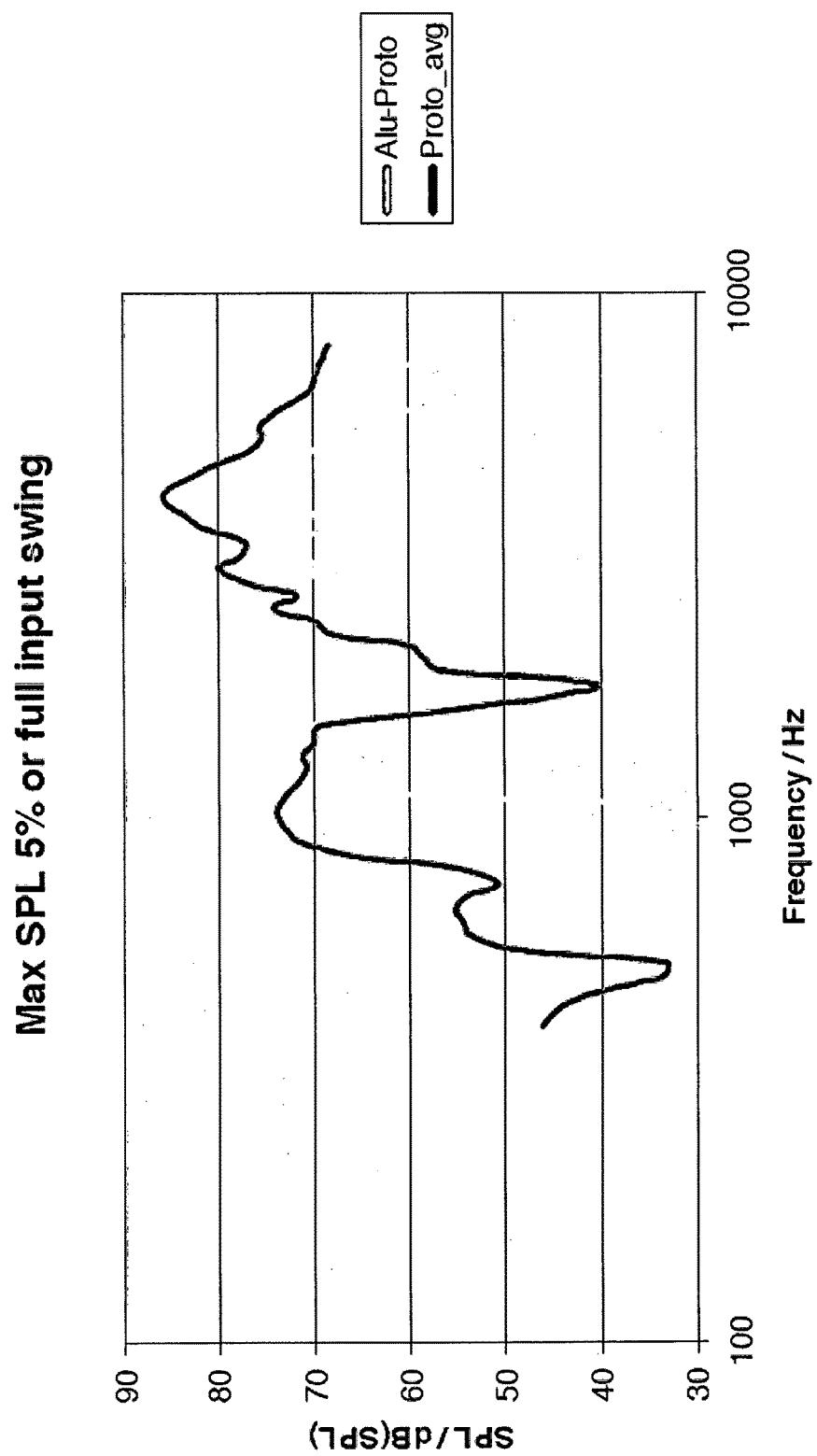
FIG. 43 shows Maximum SPL with either 5% THD or maximum input swing.

See FIG. 43. 5% THD and max amplifier input swing limited sound pressure is now at "comparable" level with dynamic speakers. Loudness is adequate for intended purpose. However, increase in low frequency (300 . . . 1000 Hz) sensitivity would enhance intelligibility of speech signal, if distortion peak are counted out.

2.4 Analysis and Conclusion of the Results

Amplifier maximum output level:

The amplifier was found linear and the design can be used in the product.

Frequency response:

New prototypes lack the smoothness of the aluminium prototypes in terms of frequency response. One possible explanation is the changes mechanics which has very different characteristics than the aluminium chassis.

There is still high attenuation on lower frequencies compared to 1 . . . 4 kHz band. Sensitivity of low frequencies should be improved to gain higher intelligibility on speech. The design needs to be improved as a complex system with many parameters. The mechanics housing needs to be tuned together with the GlassSound component which unfortunately adds complexity.

Sensitivity:

Average sensitivity of Aluminium Prototype was 73 dB, Mechanics Trial 63.5 dB and Sealed Mechanics Trial 69.1 dB. Decrease in sensitivity from Aluminium prototype to Sealed Mechanics Trial is barely audible; difference in terms of loudness rating is minimal. Overall sensitivity is on adequate level for intended purpose.

THD:

Measured THD is higher than in products with dynamic speaker, especially with higher than system tuning frequency, i.e., usable bandwidth. Distortion hints—likewise the frequency response—towards problems of system tuning. Difference is not dramatic and level of THD was not found disturbing in listening tests. However, frequency response and distortion both imply new tuning rounds are required to find the fundamental system resonance frequency; by tuning the system correctly damps THD while flattens the frequency response at the same time.

3. Mechanics Verification 3.1 Test Cases and Requirements

The background for the selected tests cases and requirements are described in the following.

Thermal Imaging:

Requirement: (YOTA-1184) [Device shall pass the surface temperature test according to IEC 60950 guidelines. Shortly requirements are 55° C. for metal—, 65° C. for ceramics—and 75° C. for plastic surfaces. Ambient temperature shall be 25° C. or 35° C. depending on customer requirement.

During the concepting phase of the product the thermal behaviour of the design was studied and concerns were raised that the device would feel too hot to be held in hand comfortably. The thermal imaging is planned to address this concern. The prototype is estimated to represent the final device well enough despite the fact that there are more components and more metal (like antennas) inside the final product. The heat may transfer faster to the surface, but the heat is expected to distribute the same way as in this prototype.

Thermal camera pictures were taken from top and bottom surfaces of the device. The prototype thermal loads were powered to bring the device internal heat at the estimated level of a ready product. The images were taken after 30 minutes heating cycle. The device was mounted on a normal wooden office table.

3.3 Test Results 3.3.1 Thermal Images

Back Display: PASS. Front display: PASS.

The construction seems to work. No hot spots seen and all the heat within 10 deg C. There is a reason to believe that the results would not change significantly in the final device if the center frame structure remains as it is.

3.4 Analysis and Conclusions of the Mechanics Testing Results

Thermal Imaging:

The thermal load level used in testing seems to be possible to handle with the current thermal construction. If thermal load will become bigger then some thermal sharing material shall be added to the bottom of the device to achieve better thermal uniformity.

The device felt comfortable in hand fully heated.

4. Conclusions and Key Findings for Product 4.1 Mechanics

There are two main issues in the design. Firstly keeping the front window itself in place is an issue as currently the window pulls out and pushes in too easily. This is shown in the random free fall results where the window detached itself during the tests. There are three solutions expected to improve the floating window construction:

1. To add fixing points for window suspension. To find the right balance between audio performance degradation due to added rigidity and improved mechanics reliability is expected to require much iteration before perfected. The mechanics trial prototype anticipates that it will be a challenging task.

2. Soft TPE cover under window. Relation between ID fine tuning versus technical audio performance. May effect some compromises between ID feeling (and look) and audio performance.

3. Window fixed by soft gasket as proposed earlier. Approximately 1 mm or more thickness for the device. Secondly the overall robustness of the design is an issue as the display is not part of the overall package as usually in mobile phones but the window floats and the main mechanics need to support itself without the window and in addition it needs to protect the window from external stress. The covers aren't as one uniform package.

Targeted final robustness and stiffness of the product can be improved by:

Designing a more rigid base frame
    Internal metal support construction, antenna performance issues to be noted
    Adding 2 . . . 3 rigid (screws) fixing points per side between internal aluminum center frame and outside base frame.
Improving back window fixing solution making back window and side as uniform assembly
Window floating solutions 2 or 3 described above will help rigidness of the overall construction Conclusion: Used mechanics construction for front window suspension targeted for best possible audio results effect noticeable reliability and usability issues. The suspension structure needs to be strengthened with an impact on the overall device dimensions.

4.2 Audio

Overall acoustic output is acceptable. The sensitivity on lower frequencies can be improved by improving the design for suspension and sealing. It is expected that the design can be made adequate for hands free calls in low noise environment.

Speaker design is now on comparable level with other commercial devices. Adding digital signal processing (DSP) to signal path would make it possible to compare audio performance on product level. However, current sharp peaks are out of capabilities of an ordinary DSP. Hard usage of equalizer would probably not yield satisfactory result due to poor phase response and added group delay. Equalizer also adds distortion.

It is important to note that there are many parameters that affect the results in the measured prototypes (aluminium, mechanics trial etc.) like:

Acoustic design, air volume behind the class, sealing of glass to the body
Glass parameters and suspension of the glass was changes to minimize the thickness of the device
Amplifier was changed to decrease size
DMA component was changed to a more production like, however this is not in serial production and is likely to be changed again Therefore the conclusion given here is still an educated guess. Narrowing the changes between the prototypes would yield more exact analysis.

Additionally, it is recommended that acoustical evaluation method is considered more in detail. GlassSound resembles more like small diffuse radiator for higher frequencies and starts to fall toward piston radiator for lower frequencies (toward radiator diameter wave-lengths). In practice, GlassSound yields much more high frequency energy in regular room environment with reflective surfaces compared to dynamic speakers, because of wider radiation pattern and lack of one localized sound source; sound reproducing surface has many highs and lows at the same time. Thus diffuse-field approximation of reverberant room should be used instead of free-field environment in anechoic room. One approximation is showed in results, but it is not type approval compliant because of its amount of work. It is suggested that methods for this would be investigated in later studies.

Tuning GlassSound for a mass product will pose a difficult question either to tune it for requirements in anechoic and free-field environment measurements or to tune it for best possible user experience as the results differ. Tuning for regulatory requirements would yield a product that does not sound too good. The method for testing could be studied further so that it could be affected and changes could be proposed for the approval instance.

GlassSound was not evaluated in earpiece mode (on ear) because with the aluminum prototype the measurements setup was found not perfect and resulted bad results. The recommendation was made to seek to improve the measurements setup by collaborating with the authorities. The Mechanics Trial Prototype is expected to provide better results with the more favorable shape.

Handset mode might require some special arrangements as well like the speaker, but on the other hand, with proper product shape and piezo location it might be possible to successfully pass regular handset requirements. There are certain "buts" in described approach compared to regular dynamic earpiece case. It is recommended to proceed with further studies about how GlassSound could be used as earpiece, but its requirements need to be taken into account separately from regular speaker usage and requirements.

The results show that the audio measurement method plays a strong role in how the product is designed.

Dual Screen Phone

In an example, there is provided a dual screen bar form factor phone with a bi-stable display. An advantage of a dual screen bar form factor phone is that one screen is always visible, whichever way up the device is placed on a table. By displaying an incoming message on both screens, this ensures that incoming messages are always visible when the device is lying on a table. The first display screen may use electrowetting technology. The second display screen may use electrowetting technology eg. Liquavista.

The device appearance may be context-related eg. in relation to position such as one determined using a global positioning system (GPS) receiver, or in relation to weather, or in relation to temperature, or in relation to time of day. Context related (eg. position-related) device appearance may include location-based advertising. Context related (eg. position-related) device appearance may include results of a location-based search.

Notification and customization are important tasks in mobile computing. For notification it is known to use sound, vibration or LCD/AMOLED (liquid crystal display/Active-matrix organic light-emitting diode) displays. All those ways provide notification for a limited time and cannot work in always-on mode due to high power consumption. There are cases with segmented bi-stable displays used for notifications, but they don't give right flexibility with notification messages or/and options.

There are many ways for customization of the device—pictures and themes for user interface (UI) on main screen, sounds and different accessories like phone cases can be used to change the look of the device. The look of the device can be changed by changing what is displayed on the bi-stable screen, such as to give the appearance of a different phone case for example. For example, the phone skin can be changed. The phone skin may be one or more of wallpaper, photos, movies, user-customized content.

In an example, there is provided a bi-stable active matrix and high-resolution display on the back panel of the device. This improvement gives the following advantages in relation to prior art cases:

Phone customization—user is able to display any pattern, picture or application interface to differentiate their phone from others Notifications—any application or service is able to display the notification on the back screen. Notification time is not limited, because a bi-stable display is used.

Notifications—any application or service is able to display the notification on the front screen. The notification such as a message may be provided on the front screen and on the back screen.

The information remains on the screen even when the phone itself is switched off. This is important even for manufacturing—a manufacturer can place all needed information directly on the bi-stable screen: eg. serial number, certification logos, country of origin and so on.

Figure 15:
FIG. 15 shows the front face and back face of an example device in the same Figure. The device is shown in the off state.

An example of the invention is shown in FIG. 15. FIG. 15 shows the front face and back face of an example device of the invention in the same Figure. The device is shown in the off state. In the off state, the front face is not illuminated: it is shown as dark. However, in the off-state, the bi-stable display on the back face continues to display content, which can be viewed as a result of external illumination eg. ambient illumination. In an example of FIG. 15, the front face has an AMOLED display, and the back face has an E-ink bi-stable display.

A bi-stable display may use interferometric modulation technology eg. Qualcomm Mirasol.

An example is shown in FIG. 3. FIG. 3 shows the front face and the back face of an example device of the invention in the same Figure. The device is shown in the on state. In the on state, the front face is illuminated and can display an image or other content. In the on-state, the bi-stable display on the back face also can display an image or other content. In an example of FIG. 3, the front face has an AMOLED display, and the back face has an E-ink bi-stable display. FIG. 3 shows a side view of an example.

An example of the invention is shown in FIG. 4. FIG. 4 shows the front face and the back face of an example device of the invention in the same Figure. The device is shown in the on state. In the on state, the front face is illuminated and can display an image or other content. In the on-state, the bi-stable display on the back face also can display an image or other content. In an example of FIG. 4, the front face has an AMOLED display, and the back face has an E-ink bi-stable display.

An example of the front display is: 4" WVGA (800×480 Or 854×480)

Technology: AMOLED or sIPS/FFS
Nissha Capacitive touch screen
Glass: Gorilla Glass (Corning)

An example of the back screen is: Electronic Paper Display under glass on back side (E-INK).

Properties of the back face may include:
E-INK Back screen
Sharp Greyscale panel
Perceived as part of case
Low power consumption Properties of the back screen may include:
1. Image
Resolution: 700-900×480 (possible target: similar to front display)
Colors: 16 Grey scale (E-ink) or 65 K (LG)
Contrast: 10:1~20:1, Reflective ratio: 40%+
Refresh ratio: 150 ms~400 ms
Ability to refresh any area starting from 1 pixel
Color scheme conforms to case color
2. Power Consumption
Approximately 1000 full screen updates using 300 mAh of charge
To minimize power consumption, update rate should be minimized to the order of twice per minute
Does not consume/require power when in bi-stable state
The back screen output may provide:
Interactions,
Control,
Use cases,
Personalization,
Widgets,
Privacy An example of interactions is text messages from a blog site. An example of control is varying the frequency of back screen updates eg. from once per minute to once per 5 minutes. An example of use cases is receipt of a major emergency notification by an emergency services worker. An example of personalization is putting a photo of a favourite landmark on the back screen. An example of privacy is removing names of companies or individuals from any received incoming message displayed on the back screen.

A bar form factor display device may be one wherein the back display screen output provides a social network screen.

Preinstalled Widgets may include: Clock, Social aggregator, Communications Log, "Favorites" Bucket, News, Weather, Yota Connection, Battery, Contacts Favorites, Latitude & Longitude, and Player.

The Back Screen may provide:
Context related Themes (Weather, Location, Environment)
Widgets, Notifications
Personalization
Post cards
Operator Push (Congratulations, Customer info)

The back display of the device may display news provided by a news service. The back display of the device may display social messages provided by a social messaging service. The back display of the device may display output providing social aggregator output or social network output. The social aggregator output or social network output may be a Facebook page. The back display of the device may display a Google search page. The back display of the device may display an indication of mobile phone signal strength. The back display of the device may display an indication of battery charge state. The back display of the device may display calendar information.

The back display of the device may be the only operational display of the device when the device operates in a low power notification mode. When the device operates in a low power notification mode the back display of the device may be updated in response to an incoming news story provided by a news service. When the device operates in a low power notification mode the back display of the device may be updated in response to an incoming social message provided by a social messaging service. The device may be programmed such that when the device operates in a low power notification mode, the back display of the device displays content updates of one or more categories, for example, news, social messages, an emergency notification, financial news, earthquake, tsunami or weather. The categories may be preselected, such as by a user or by a network services provider.

Further Aspects of the Mobile Device

The mobile device may be portable. The mobile device may be a mobile phone, a portable digital assistant, a laptop, a digital audio player or a tablet computer. Known digital audio players include the ipod and mp3 players. Known tablet computers include the ipad. The device may include a virtual keyboard. The device may have a touch screen. The device may have two screens each of which is a touch screen. A screen may be bi-stable; a bi-stable screen may be a touch screen. A screen that is not a bi-stable screen may be a touch screen. The device may include a second bi-stable screen. The device may include a second bi-stable screen which is a touch screen. The device may include a second bi-stable screen which is not a touch screen.

A screen may occupy greater than 50% of the area of the major face of the device on which it is located. A screen may occupy greater than 60% of the area of the major face of the device on which it is located. A screen may occupy greater than 70% of the area of the major face of the device on which it is located. A screen may occupy greater than 80% of the area of the major face of the device on which it is located. A screen may occupy greater than 90% of the area of the major face of the device on which it is located. A screen may occupy greater than 95% of the area of the major face of the device on which it is located.

The device may comprise a single backlight module situated between its two major faces. The backlight module may illuminate one display on one major face. The backlight module may illuminate two displays each of which is situated on a different major face of the device to the other display.

The device may comprise two backlight modules, each of which may illuminate a display situated on a major face of the device. Each backlight module may illuminate a respective display on a respective major face of the device. The two backlight modules may be situated between two displays of the device, where each display is situated on a different major face of the device to the other display.

The device may have flat (i.e. non-curved) front and back major faces. The device may have one major face that is curved with the other major face being flat (i.e. non-curved).

Curved bar form factor display device (eg. phone)

The bar form factor display device (eg. a phone) may have a unique and organic shape—essential for rapid product differentiation in a crowded space. Examples are shown in FIGS. 3 and 4. The bar form factor display device may have a concave front face and a convex rear face. The magnitude of the curvature of the faces may be the same or similar. The concave front may match the path of a finger as the user's wrist rotates. Hence it's very natural to use. Having a curved surface as the vibrating distributed mode loudspeaker (DML) speaker is also better since if the front display with the speaker exciters was instead a flat surface, then it would sound unpleasant if that flat surface is placed down against a tabletop. Curving the surface prevents this happening. Preferred curvature of front and back is cylindrical, but spherical or aspherical are possible. The convex back can have a bistable display. Since the normal resting position is front face down, the back screen with bi-stable display is normally displayed when bar form factor display device is in the resting position. This resting position is mechanically stable. If bar form factor display device is placed back down (ie convex face down), the bar form factor display device could spin, which is unstable. Hence a user will likely place bar form factor display device front face (i.e. concave face) down, with the bi-stable screen showing.

If the bar form factor display device is in a pocket, the front face (concave face) can face inwards, since this better matches leg curvature. This can be the better configuration (as opposed to front face up) for antenna reception.

In manufacturing, the curved shape may be laminated to glass.

Mobile Hot Spot—('Instant 4G', for Example)

We provide a simple hard (or soft) switch on a mobile phone, to enable instant and automatic sharing of a WiFi network, using the phone as a mobile hot spot. For example, a user can instantly share internet access using this switch on the phone, instead of a complex user interface (UI). So one use could be at a party to instantly enable friends to access the internet via your phone. Files on the phone could then also be shared (access control would prevent other files from being shared). Alternatively, files on the phone could be shared without providing internet access. A simple hard (or soft) switch on the mobile phone may be provided to disable sharing of a WiFi network.

We provide a simple hard (or soft) switch on a mobile device, to enable instant and automatic sharing of a WiFi network, using the device as a mobile hot spot. For example, a user can instantly share internet access using this switch on the device, instead of a complex user interface (UI). So one use could be at a party to instantly enable friends to access the internet via your mobile device. Files on the mobile device could then also be shared (access control would prevent other files from being shared). The mobile device may be a mobile phone, a mobile smart phone, or a mobile tablet computer device, for example. Alternatively, files on the mobile device could be shared without providing internet access. A simple hard (or soft) switch on the mobile device may be provided to disable sharing of a WiFi network.

We provide a hidden mechanical button on a mobile phone, to enable instant and automatic sharing of a WiFi network, using the phone as a mobile hot spot. For example, a user can instantly share internet access using this hidden mechanical button on the phone, instead of a complex user interface (UI). So one use could be at a party to instantly enable friends to access the internet via your phone. Files on the phone could then also be shared (access control would prevent other files from being shared). Alternatively, files on the phone could be shared without providing internet access. A hidden mechanical button on the mobile phone may be provided to disable sharing of a WiFi network.

We provide a hidden mechanical button on a mobile device, to enable instant and automatic sharing of a WiFi network, using the device as a mobile hot spot. For example, a user can instantly share internet access using this hidden mechanical button on the device, instead of a complex user interface (UI). So one use could be at a party to instantly enable friends to access the internet via your mobile device. Files on the mobile device could then also be shared (access control would prevent other files from being shared). The mobile device may be a mobile phone, a mobile smart phone, or a mobile tablet computer device, for example. Alternatively, files on the mobile device could be shared without providing internet access. A hidden mechanical button on the mobile device may be provided to disable sharing of a WiFi network.

We provide squeeze control on a mobile phone, to enable instant and automatic sharing of a WiFi network, using the phone as a mobile hot spot. For example, a user can instantly share internet access using this squeeze control on the phone, instead of a complex user interface (UI). So one use could be at a party to instantly enable friends to access the internet via your phone. Files on the phone could then also be shared (access control would prevent other files from being shared). Alternatively, files on the phone could be shared without providing internet access. Squeeze control on the mobile phone may be provided to toggle on/off the sharing of a WiFi network.

We provide squeeze control on a mobile device, to enable instant and automatic sharing of a WiFi network, using the device as a mobile hot spot. For example a user can instantly share internet access using this squeeze control on the device, instead of a complex user interface (UI). So one use could be at a party to instantly enable friends to access the internet via your mobile device. Files on the mobile device could then also be shared (access control would prevent other files from being shared). The mobile device may be a mobile phone, a mobile smart phone, or a mobile tablet computer device, for example. Alternatively, files on the mobile device could be shared without providing internet access. Squeeze control on the mobile device may be provided to toggle on/off the sharing of a WiFi network.

We provide capacitor sensor strips in a mobile phone, so that the mobile phone can know if a user has picked it up, such that when a user has picked it up, this enables instant and automatic sharing of a WiFi network, using the phone as a mobile hot spot. For example, a user can instantly share internet access by picking up the phone, instead of a complex user interface (UI). So one use could be at a party to instantly enable friends to access the internet via your phone. Files on the phone could then also be shared (access control would prevent other files from being shared). Alternatively, files on the phone could be shared without providing internet access. Instant and automatic sharing of a WiFi network may be disabled when the user puts the phone down.

We provide capacitor sensor strips in a mobile device, so that the mobile device can know if a user has picked it up, such that when a user has picked it up, this enables instant and automatic sharing of a WiFi network, using the device as a mobile hot spot. For example a user can instantly share internet access by picking up the device, instead of a complex user interface (UI). So one use could be at a party to instantly enable friends to access the internet via your mobile device. Files on the mobile device could then also be shared (access control would prevent other files from being shared). The mobile device may be a mobile phone, a mobile smart phone, or a mobile tablet computer device, for example. Alternatively, files on the mobile device could be shared without providing internet access. Instant and automatic sharing of a WiFi network may be disabled when the user puts the device down.

The mobile phone may be connected to a 4G mobile phone network. The mobile phone may be connected to a 3G mobile phone network. The mobile phone may be connected to a 2G mobile phone network. The mobile device may be connected to a 4G mobile phone network. The mobile device may be connected to a 3G mobile phone network. The mobile device may be connected to a 2G mobile phone network.

The mobile device (eg. mobile phone) may be a bar form factor device. The device case may be a single block. The device may have a touch screen. The device operating system may be Google Android. The device may have a bistable screen. The device may have a touch screen and a further bistable screen. The bistable screen may be one which can be refreshed wholly or partially, such as for a limited screen area or the whole screen area, starting with any pixel in that screen area. A glass substrate of the device may be curved in conformity with device surface curvature.

The bar form factor display device may comprise a plurality of display screens. Bar form factors include slab, slate, block, bar and candybar. Bar form factor display devices, eg. slate devices such as the iPhone™ and the iPad™, are known. However, these devices comprise only a single display screen. A bar form factor device may be a slate device.

The mobile device (eg. mobile phone) may be used to define a limited set of users who may connect to the device to enable instant and automatic sharing of a WiFi network with the limited set of users.

The mobile device (eg. mobile phone) may provide a wireless connection to a personal computer, to enable that computer to connect to the internet.

The mobile device (eg. mobile phone) may provide a wireless connection to two personal computers, to enable file sharing or resource sharing (eg. sharing of application software) between those two personal computers via a trusted intermediary: the mobile device.

The mobile device (eg. mobile phone) may provide for file synchronization for files that are shared using automatic sharing of a WiFi network via the mobile device.

The mobile device may be a personal computer, a video game console, a smartphone, a digital audio player, a mobile phone or a tablet computer, for example. The mobile device may include an integral GPS antenna.

The mobile device (eg. mobile phone) may provide instant and automatic sharing of a wireless network in response to a single action by a user, the single action comprising a physical contact gesture by the user with the mobile device, or a voice activation command, when the device is already turned on and connected to a mobile phone network. Sharing may be with a device of another user, or with a plurality of other user devices.

Virtual Web-USB Interface for Wireless Devices iPhone/iPad has no universal serial bus (USB) connector—a major disadvantage. We provide a WiFi connection from a WiFi dongle with a USB interface; a mobile device can then interface to a memory in the WiFi dongle, plus any external device that the USB dongle is plugged into, just as though the USB interface was native to the mobile device. So you could view the file structure of files stored on the USB dongle itself in a web browser on the mobile device, or print to a printer the USB dongle is interfaced to, or print to a printer the mobile phone is connected to, for example. The mobile device (eg. mobile phone) may provide automatic wireless network sharing.

USB Stick for in-Vehicle Audio

In-vehicle (eg. in-car) audio systems often have USB interfaces for MP3 files, but have no way of accessing internet radio (that is currently only available on really high-end systems). We provide a wireless data enabled USB dongle that can receive streaming radio (e.g. for internet radio stations, Spotify etc.) The wireless data enabled USB dongle may interface wirelessly with a mobile phone or other mobile device. The mobile phone or other mobile device may provide automatic wireless network sharing. The mobile phone or other mobile device may provide wireless access to the internet, thereby providing access via the internet to radio stations that cannot be received by a vehicle radio broadcast receiver. The USB dongle captures a data stream and converts it to a sequence of files—just like the MP3 files the in-vehicle (eg. in-car) audio is designed to read. This enables even a basic in-vehicle (eg. in-car) audio device to have playback/rewind, store etc. functionality for internet radio.

The streamed audio is stored as at least two separate files, which allows the user to choose to skip to the next track using the car audio system software. The user can listen to music online in his vehicle (eg. a car) with no modifications to the in-vehicle (eg. in-car) audio system. An online interface is used for setting up the service, selecting stream source. The online interface may be provided by the mobile phone or other mobile device.

Device With no Visible Mechanical Buttons Example

The mobile device (eg. mobile phone) may present a seamless, unibody surface—although it can still have hidden mechanical buttons e.g. for volume up, volume down.

Squeeze Control Example

The mobile device (eg. mobile phone) may be turned on or off by squeezing it.

Curved Phone Example

A unique and organic phone shape—essential for rapid product differentiation in a crowded space. The mobile phone has a concave front face and a convex rear face, which may be of same or similar magnitude of curvature. Concave front may match a path of a finger as wrist rotates. Hence it's very natural to use. Having a curved surface as the vibrating distributed mode loudspeaker (DML) speaker is also better since if the main screen (eg. LCD) with the speaker exciters was instead a flat surface, then it would sound unpleasant if that flat surface is placed down against a tabletop. Curving the surface prevents this happening. Preferred curvature of front and back is cylindrical, rather than spherical or aspherical.

The convex back can have a bistable display. Since the normal resting position is front face down, the back screen with bi-stable display is normally displayed when phone is in the resting position. This resting position is stable. If phone is placed back down (ie convex face down), the phone could spin, which is unstable. Hence a user will likely place phone front face (i.e. concave face) down, with the bi-stable screen showing.

When the phone is in a pocket, the front face (concave face) can face inwards, since this better matches leg curvature. This can be the better configuration (as opposed to front face up) for antenna reception.

Curved Device Example

A unique and organic device shape—essential for rapid product differentiation in a crowded space. The mobile device has a concave front face and a convex rear face, which may be of same or similar magnitude of curvature. Concave front may match a path of a finger as wrist rotates. Hence it's very natural to use. Having a curved surface as the vibrating DML speaker is also better since if the main screen (eg. LCD) with the speaker exciters was instead a flat surface, then it would sound unpleasant if that flat surface is placed down against a tabletop. Curving the surface prevents this happening. Preferred curvature of front and back is cylindrical, rather than spherical or aspherical.

The convex back can have a bistable display. Since the normal resting position is front face down, the back screen with bi-stable display is normally displayed when device is in the resting position. This resting position is stable. If the device is placed back down (ie convex face down), the device could spin, which is unstable. Hence a user will likely place device front face (i.e. concave face) down, with the bi-stable screen showing.

When the device is in a pocket, the front face (concave face) can face inwards, since this better matches leg curvature. This can be the better configuration (as opposed to front face up) for antenna reception.

The curved device may be a mobile phone, a mobile smart phone, a mobile tablet computer device, a personal computer, a video game console, or a digital audio player, for example.

Capacitive 'Hold' Sensors Example

With a conventional phone, one has to manually activate the home screen if the phone is in its idle state, usually by pressing a button. We use capacitor sensor strips in the phone, so that the phone can know if the user has picked it up and then automatically wake-up—e.g. activate the start-up/home screen.

This could be used instead of a soft or hard key lock on the phone as well as for the screen brightness.

LAN Connectivity Management (Wi-Fi Interface Management for Portable Devices)

A portable router device is provided with a Wide Area Network (WAN) interface (using for instance standardized telecommunications such as 2G/3G/4G/LTE) and a Local Area Network (LAN) interface (for instance WiFi networks, campus networks, personal networks including Bluetooth and other short range network connectivity). The LAN interface may be switched on only when the device has connected to the WAN. The LAN interface may be switched on only within a predefined range of WAN signal strength. Other devices are able to connect, through the router, to the WAN network (for example to the internet) via the LAN interface when the LAN interface is activated.

The LAN interface of the router device may be deactivated when the device is not connected to a WAN network. The LAN interface of the router device may be deactivated when the WAN signal strength is below a predefined level. In one example the signal level has to be below the threshold for a certain time before the LAN interface is deactivated. The router device may maintain the LAN activation if for instance there is communication between other devices on the LAN, even when otherwise it would have deactivated the LAN interface because for example there is no connection to a WAN network or the WAN signal strength is below a predefined level.

The router device reduces power consumption (it is powered for instance with a battery or powered by mains electricity) when the LAN interface is switched off.

When the WAN connection is absent, or the WAN signal strength is too weak, deactivating the LAN interface will also provide the correct user experience for users of other LAN devices possibly using the router device.

The other LAN devices will for instance not try to connect to the internet using the router, if the router is in a low WAN signal strength area (non-serviceable area).

Already existing devices such as portable routers and phones with a portable router function, will provide the option to enable or disable the LAN interface, but not depending on if the device is connected to WAN network or not.

There is provided a portable router device; it has WAN interface (eg. 2G/3G/4G) and LAN interface (eg. WiFi). In the case in which we have a WAN (eg. 2G, 3G, 4G) signal, the LAN (eg. Wi-Fi) interface is switched on and Wi-Fi devices are able to connect to the WAN through the router. In the case in which we don't have WAN signal, we turn LAN interface (eg. Wi-Fi) off to save the battery power and to provide the right user experience in Wi-Fi devices such as iPhone: they'll not try to connect to internet through the router in the case in which the router is in a non-serviceable area.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Appendix 1: Wi-Fi Primer

WI-FI is a registered USA trademark of the Wi-Fi Alliance, 10900-B Stonelake Boulevard, Suite 126, Austin, Tex. 78759 United States, trademark Registration Number 2525795. A Wi-Fi enabled device such as a personal computer, video game console, smartphone, or digital audio player can connect to the Internet when within range of a wireless network connected to the Internet. The coverage of one or more (interconnected) access points—which may be called hotspots when offering public access—generally comprises an area the size of a few rooms but may be expanded to cover many square miles, depending on the number of access points with overlapping coverage.

The Affiance has generally enforced the use of 'Wi-Fi' to describe only a narrow range of connectivity technologies including wireless local area network (WLAN) based on the IEEE 802.11 standards, device to device connectivity (such as Wi-Fi Peer to Peer, also known as Wi-Fi Direct), and a range of technologies that support PAN (Personal area network), LAN (Local area network) and even WAN (Wide area network) connections.

A Wi-Fi enabled device such as a personal computer, video game console, smartphone or digital audio player can connect to the Internet when within range of a wireless network connected to the Internet. The coverage of one or more (interconnected) access points—which may be called hotspots—can comprise an area as small as a few rooms or as large as many square miles. Coverage in the larger area may depend on a group of access points with overlapping coverage. Wi-Fi technology has been used in wireless mesh networks, for example, in London, UK.

In addition to private use in homes and offices, Wi-Fi can provide public access at Wi-Fi hotspots provided either free-of-charge or to subscribers to various commercial services. Organizations and businesses—such as those running airports, hotels and restaurants—often provide free-use hotspots to attract or assist clients.

A wireless access point (WAP) connects a group of wireless devices to an adjacent wired LAN. An access point resembles a network hub, relaying data between connected wireless devices in addition to a (usually) single connected wired device, most often an ethernet hub or switch, allowing wireless devices to communicate with other wired devices.

Wireless adapters allow devices to connect to a wireless network. These adapters connect to devices using various external or internal interconnects such as PCI (Peripheral Component Interconnect), miniPCI (mini Peripheral Component Interconnect), USB (Universal Serial Bus), ExpressCard, Cardbus and PC Card (originally PCMCIA Card; PCMCIA stands for Personal Computer Memory Card International Association). As of 2010, most newer laptop computers come equipped with internal adapters. Internal cards are generally more difficult to install.

Wireless routers integrate a Wireless Access Point, ethernet switch, and internal router firmware application that provides IP (Internet Protocol) routing, NAT (Network address translation), and DNS (Domain Name System) forwarding through an integrated WAN-interface. A wireless router allows wired and wireless ethernet LAN devices to connect to a (usually) single WAN device such as a cable modem or a DSL (Digital Subscriber Line) modem. A wireless router allows all three devices, mainly the access point and router, to be configured through one central utility. This utility is usually an integrated web server that is accessible to wired and wireless LAN clients and often optionally to WAN clients. This utility may also be an application that is run on a desktop computer such as Apple's AirPort.

Wireless network bridges connect a wired network to a wireless network. A bridge differs from an access point: an access point connects wireless devices to a wired network at the data-link layer. Two wireless bridges may be used to connect two wired networks over a wireless link, useful in situations where a wired connection may be unavailable, such as between two separate homes.

Wireless range-extenders or wireless repeaters can extend the range of an existing wireless network. Strategically placed range-extenders can elongate a signal area or allow for the signal area to reach around barriers such as those pertaining in L-shaped corridors. Wireless devices connected through repeaters will suffer from an increased latency for each hop. Additionally, a wireless device connected to any of the repeaters in the chain will have a throughput limited by the "weakest link" between the two nodes in the chain from which the connection originates to where the connection ends.

Appendix 2: Concepts

A. Yota Introduction

1. The main focus for Yota's IP protection strategy will be its new LTE phone. The LTE phone will include innovative software, hardware and provide an innovative user experience.

B. List of Concepts

1. 'Meet Camera'—Seeing Eye-to-Eye when Video Conferencing

Conventional video phones give a very poor user experience because there's rarely eye-to-eye contact—instead, the caller seems to be looking away from you since he's looking away from the camera. We place cameras on either side of the LCD screen to create a virtual camera in the centre of the screen, using an algorithm based on the two images. The image taken by the virtual camera is what is shown to the other party: this gives the impression to the other party that you are looking directly at them—a much better user experience. One advantage of Meet Camera is that one can approach a large panel display with always on video-conferencing and talk directly to the person shown on it—giving the feeling of eye-to-eye contact.

Figure 13:
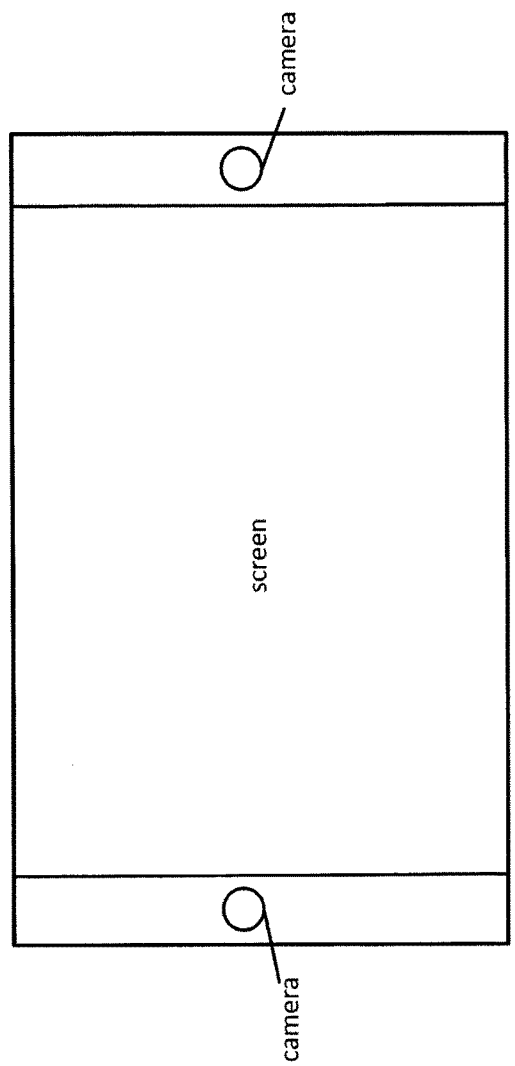
FIG. 13 shows an example of a mobile device with two cameras, with a screen between the cameras.

The face displayed by the virtual camera can be placed in the centre of the screen, even if the face of the person whose image is being captured moves significantly away from the centre of the screen. This placement can be accomplished by a tracking algorithm. See FIG. 13.

2. Capacitive 'Hold' Sensors

With a conventional phone, one has to manually activate the home screen if the phone is in its idle state, usually by pressing a button. We use capacitor sensor strips in the phone, so that the phone can know if the user has picked it up and then automatically wake-up—e.g. activate the start-up/home screen.

This could be used instead of a soft or hard key lock on the phone as well as for the screen brightness.

3. DML Phone Speaker

It's hard to get good quality audio performance, unless you have a large speaker with a large and ugly speaker hole. We use NXT plc distributed mode loudspeaker (DML) technology here to vibrate the entire phone screen—the whole screen surface acts as the speaker. The speaker hole can be fully eliminated. One can use two small drivers/exciters under the glass to make the screen vibrate. DML has never been used before to drive a screen surface in a mobile phone. Haptic feedback can be provided by the drivers too—a new use for the DML exciters.

4. Mobile Hot Spot—'Instant 4G'

We provide a simple hard (or soft) switch on phone, to enable instant and automatic sharing of a WiFi network, using the phone as a mobile hot spot. A user can instantly share internet access using this switch on the phone, instead of a complex user interface (UI). So one could use be at a party to instantly enable friends to access the internet via your phone. Files on the phone could then also be shared (access control would prevent other files from being shared).

5. Virtual Web-USB Interface for Wireless Devices iPhone/iPad has no USB connector—a major disadvantage. We provide a WiFi connection from a WiFi dongle with a USB interface; the iPhone/iPad can then interface to a memory in the WiFi dongle, plus any external device that the USB dongle is plugged into, just as though the USB interface was native to the iPhone. So you could view the file structure of files stored on the USB dongle itself in a web browser on the iPhone, or print to a printer the USB dongle is interfaced to.

6. USB Stick for in-Car Audio

In-car audio systems often have USB interfaces for MP3 files, but will have no way of accessing internet radio (that is currently only available on really high-end systems). We provide a wireless data enabled USB dongle that can receive streaming radio (e.g. for internet radio stations, Spotify etc.) The USB dongle captures the data stream and converts it to a sequence of files—just like the MP3 files the in-car audio is designed to read. This enables even a basic in-car audio device to have playback/rewind, store etc. functionality for internet radio.

The streamed audio is stored as at least two separate files, which allows the user to choose to skip to the next track using the car audio system software. The user can listen to music online in his car with no modifications to the in-car audio system. An online interface is used for setting up the service, selecting stream source.

7. User Experience (UX) to Identify Sound Sources

Individual sound sources (different people speaking at a phone in hands-free mode) are identified with two or more inbuilt microphones. Then the individual sources are graphically represented on the device relative to their position in the room. A visual interface on the phone enables selection by hand of which sound source to record e.g. to optimise the noise cancellation/sonic focus for the selected sound source. This could be advantageous in for instance meetings where one person is talking and you want to aggressively noise cancel everything else.

8. Phone with No Visible Mechanical Buttons

The phone presents a seamless, unibody surface—although it can still have hidden mechanical buttons e.g. for volume up, volume down.

9. Squeeze Control

You can turn the phone on or off by squeezing it.

10. Curved Phone

A unique and organic phone shape—essential for rapid product differentiation in a crowded space. The mobile phone has a concave front face and a convex rear face, of same or similar magnitude of curvature. Concave front matches path of finger as wrist rotates. Hence it's very natural to use. Having a curved surface as the vibrating DML speaker is also better since if the LCD with the speaker exciters was instead a flat surface, then it would sound unpleasant if that flat surface is placed down against a tabletop. Curving the surface prevents this happening. Preferred curvature of front and back is cylindrical, rather than spherical or aspherical.

The convex back can have a bistable display. Since the normal resting position is front face down, the back screen with bi-stable display is normally displayed when phone is in the resting position. This resting position is stable. If phone is placed back down (ie convex face down), the phone could spin, which is unstable. Hence a user will likely place phone front face (i.e. concave face) down, with the bi-stable screen showing.

When the phone is in a pocket, the front face (concave face) can face inwards, since this better matches leg curvature. This can be the better configuration (as opposed to front face up) for antenna reception.

11. Microphone in SIM Card "Eject Hole"

Figure 14:
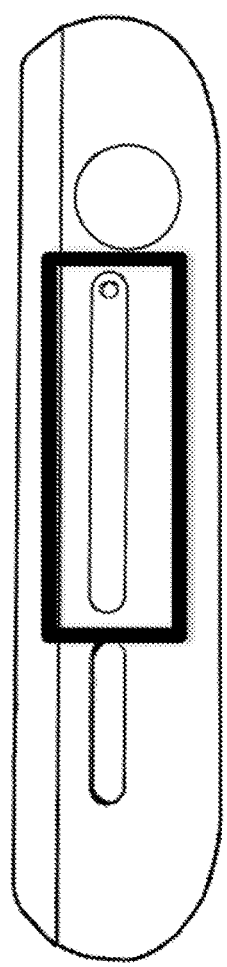
FIG. 14 shows an example of a mobile device in which the microphone is placed in a hole in the body of the mobile device, in the SIM card's eject hole.

The microphone is placed in a hole in the body of the mobile device, in the SIM card's eject hole. See FIG. 14.

12. Tactile Casing of Mobile Device

The casing of the mobile device consists of a material that can change its tactile properties from wood to metal ("morphing").

Appendix 3: Primer on LTE

3GPP Long Term Evolution (LTE), is the latest standard in the mobile network technology tree that produced the GSM/EDGE and UMTS/HSPA network technologies. It is a project of the 3rd Generation Partnership Project (3GPP), operating under a name trademarked by one of the associations within the partnership, the European Telecommunications Standards Institute.

The current generation of mobile telecommunication networks are collectively known as 3G (for "third generation"). Although LTE is often marketed as 4G, first-release LTE does not fully comply with the IMT Advanced 4G requirements. The pre-4G standard is a step toward LTE Advanced, a 4th generation standard (4G) of radio technologies designed to increase the capacity and speed of mobile telephone networks. LTE Advanced is backwards compatible with LTE and uses the same frequency bands, while LTE is not backwards compatible with 3G systems.

MetroPCS and Verizon Wireless in the United States and several worldwide carriers announced plans, beginning in 2009, to convert their networks to LTE. The world's first publicly available LTE-service was opened by TeliaSonera in the two Scandinavian capitals Stockholm and Oslo on the 14th of Dec. 2009. LTE is a set of enhancements to the Universal Mobile Telecommunications System (UMTS) which was introduced in 3rd Generation Partnership Project (3GPP) Release 8. Much of 3GPP Release 8 focuses on adopting 4G mobile communication's technology, including an all-IP flat networking architecture. On Aug. 18, 2009, the European Commission announced it will invest a total of €18 million into researching the deployment of LTE and the certified 4G system LTE Advanced.

While it is commonly seen as a cell phone or common carrier development, LTE is also endorsed by public safety agencies in the US as the preferred technology for the new 700 MHz public-safety radio band. Agencies in some areas have filed for waivers hoping to use the 700 MHz spectrum with other technologies in advance of the adoption of a nationwide standard.

The LTE specification provides downlink peak rates of at least 100 Mbps, an uplink of at least 50 Mbps and RAN round-trip times of less than 10 ms. LTE supports scalable carrier bandwidths, from 1.4 MHz to 20 MHz and supports both frequency division duplexing (FDD) and time division duplexing (TDD).

Part of the LTE standard is the System Architecture Evolution, a flat IP-based network architecture designed to replace the GPRS Core Network and ensure support for, and mobility between, some legacy or non-3GPP systems, for example GPRS and WiMAX respectively.

The main advantages with LTE are high throughput, low latency, plug and play, FDD, and TDD in the same platform, an improved end-user experience and a simple architecture resulting in low operating costs. LTE will also support seamless passing to cell towers with older network technology such as GSM, cdmaOne, UMTS, and CDMA2000. The next step for LTE evolution is LTE Advanced and is currently being standardized in 3GPP Release 10.

Appendix 4: Primer on LTE Advanced

LTE Advanced is a preliminary mobile communication standard, formally submitted as a candidate 4G system to ITU-T in late 2009, was approved into ITU, International Telecommunications Union, IMT-Advanced and expected to be finalized by 3GPP in early 2011. It is standardized by the 3rd Generation Partnership Project (3GPP) as a major enhancement of the 3GPP Long Term Evolution (LTE) standard.

The LTE format was first proposed by NTT DoCoMo of Japan and has been adopted as the international standards. LTE standardization has come to a mature state by now where changes in the specification are limited to corrections and bug fixes. The first commercial services were launched in Scandinavia in December 2009 followed by the United States and Japan in 2010. More first release LTE networks are expected to be deployed globally during 2010 as a natural evolution of several 2G and 3G systems, including Global system for mobile communications (GSM) and Universal Mobile Telecommunications System (UMTS) (3GPP as well as 3GPP2).

Being described as a 3.9G (beyond 3G but pre-4G) technology the first release LTE does not meet the IMT Advanced requirements for 4G also called IMT Advanced as defined by the International Telecommunication Union such as peak data rates up to 1 Gbit/s. The ITU has invited the submission of candidate Radio Interface Technologies (RITs) following their requirements as mentioned in a circular letter. The work by 3GPP to define a 4G candidate radio interface technology started in Release 9 with the study phase for LTE-Advanced. The requirements for LTE-Advanced are defined in 3GPP Technical Report (TR) 36.913, "Requirements for Further Advancements for E-UTRA (LTE-Advanced)." These requirements are based on the ITU requirements for 4G and on 3GPP operators' own requirements for advancing LTE. Major technical considerations include the following:

Continual improvement to the LTE radio technology and architecture

Scenarios and performance requirements for interworking with legacy radio access technologies Backward compatibility of LTE-Advanced with LTE. An LTE terminal should be able to work in an LTE-Advanced network and vice versa. Any exceptions will be considered by 3GPP.

Account taken of recent World Radiocommunication Conference (WRC-07) decisions regarding new IMT spectrum as well as existing frequency bands to ensure that LTE-Advanced geographically accommodates available spectrum for channel allocations above 20 MHz. Also, requirements must recognize those parts of the world in which wideband channels are not available.

Likewise, 802.16m, 'WiMAX 2', has been approved by ITU into the IMT Advanced family. WiMAX 2 is designed to be backward compatible with WiMAX 1/1.5 devices. Most vendors now support ease of conversion of earlier 'pre-4G', pre-advanced versions and some support software defined upgrades of core base station equipment from 3G.

The mobile communication industry and standardization organizations have therefore started to work on 4G access technologies such as LTE Advanced. At a workshop in April 2008 in China 3GPP agreed the plans for future work on Long Term Evolution (LTE). A first set of 3GPP requirements on LTE Advanced has been approved in June 2008. Besides the peak data rate 1 Gbit/s that fully supports the 4G requirements as defined by the ITU-R, it also targets faster switching between power states and improved performance at the cell edge. Detailed proposals are being studied within the working groups.

What is claimed is:

1. A mobile device comprising:
   a first screen;
   a device operable to provide sound output from all or part of the first screen, the first screen thereby acting as a speaker;
   window suspension elements for the first screen using TPE material, wherein the window suspension elements comprises a front window suspension arranged using soft TPE material having a thickness of 0.2 to 2 mm situated at the top of the device side walls and under the window; and
   voltage boosting components for providing a required driving voltage for audio actuators from a battery voltage source.

2. The mobile device of claim 1, wherein the device comprises distributed mode loudspeaker (DML) technology arranged to vibrate all or part of the entire first screen.

3. The mobile device of claim 1, wherein the mobile device does not have any apertures in a casing of the mobile device to allow audio playback from an internal speaker.

4. The mobile device of claim 1, comprising at least one of: (i) two small drivers/exciters arranged under the first screen to make the first screen vibrate; (ii) a main cover assembly comprising a main window suspension; (iii) an engine board comprising battery charging solution and one or more audio amplifiers; (iv) audio actuators connected using board-to-wire connectors; and (v) a front window operable to be suspended using a window frame.

5. The mobile device of claim 1, wherein the window suspension elements further comprises a front window suspension arranged using (i) a window frame; and (ii) TPE material having shore stiffness from 60 A to 95 A that are arranged between the window frame and side walls of the device.

6. The mobile device of claim 1, wherein the device further comprises one or more of: (i) left and right side walls comprising soft back cavity shielding lips operable to isolate the back cavity from a freely suspended front side of the device; (ii) fixed points for front window suspension; (iii) an internal metal support construction; (iv) two or three rigid fixing points per side between an internal aluminum center frame and an outside base frame; or (v) a sealed air volume behind the first screen.

7. The mobile device of claim 1, comprising an audio system comprising one or more of: (i) On-board Audio: 128-Voice Polyphony, QconcertPlus, (ii) Dolby 5.1 Surround, (iii) Echo and Noise Cancellation. (iv) Additional ANC (Audience), (v) Deep stereo Surface Sound, or (vi) Adaptive Noise Cancellation.

8. The mobile device of claim 1, wherein the mobile device is a dual screen bar form factor phone with a back screen bi-stable display as a second screen and comprising a concave front face and a convex rear face.

9. A mobile device comprising:
   a first screen;
   a device operable to provide sound output from all or part of the first screen, the first screen thereby acting as a speaker;
   window suspension elements for the first screen using TPE material;
   voltage boosting components for providing a required driving voltage for audio actuators from a battery voltage source; and
   a single block plastic or thermoplastic polyurethane device case and an aluminum center part for distributing heat evenly.

10. The mobile device of claim 9, further comprising drivers in attachment with the first screen operable to provide haptic feedback from all or part of the first screen and wherein the drivers comprise electro active polymers.

11. The mobile device of claim 9, wherein the device further comprises a driver module and wherein the first screen is a touch screen, wherein the driver module operable to control exciters to disperse bending waves evenly across the surface of the touch screen.

12. A mobile device comprising:
   a first screen;
   a device operable to provide sound output from all or part of the first screen, the first screen thereby acting as a speaker;
   window suspension elements for the first screen using TPE material, wherein the window suspension elements comprises at least one of: (i) a back cavity air gasket comprising soft TPE or (ii) a front window module in direct attachment to a TPE outside skin for providing increasing elasticity of a suspension area; and
   voltage boosting components for providing a required driving voltage for audio actuators from a battery voltage source.

* * * * *